United States Patent
Hofman et al.

(10) Patent No.: US 9,462,782 B2
(45) Date of Patent: *Oct. 11, 2016

(54) SYSTEM AND METHOD FOR CONTROLLING THE POSITION OF A ROBOT CARRIAGE BASED ON THE POSITION OF A MILKING STALL OF AN ADJACENT ROTARY MILKING PLATFORM

(71) Applicant: TECHNOLOGIES HOLDINGS CORP., Houston, TX (US)

(72) Inventors: Henk Hofman, Lemmer (NL); Cor de Ruijter, Staphorst (NL); Menno Koekoek, Droenten (NL); Peter Willem van der Sluis, IJsselmuiden (NL)

(73) Assignee: Technologies Holdings Corp., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/922,725

(22) Filed: Oct. 26, 2015

(65) Prior Publication Data

US 2016/0037747 A1 Feb. 11, 2016

Related U.S. Application Data

(63) Continuation of application No. 14/329,399, filed on Jul. 11, 2014, now Pat. No. 9,247,709, which is a continuation of application No. 13/448,897, filed on Apr. 17, 2012, now Pat. No. 8,800,487, which is a (Continued)

(51) Int. Cl.
*A01K 1/12* (2006.01)
*A01J 7/04* (2006.01)
(Continued)

(52) U.S. Cl.
CPC ............... *A01K 1/126* (2013.01); *A01J 5/003* (2013.01); *A01J 5/007* (2013.01); *A01J 5/017* (2013.01); *A01J 5/0175* (2013.01); *A01J 7/04* (2013.01)

(58) Field of Classification Search
CPC .......... A01K 1/126; A01J 5/003; A01J 5/007
USPC ....................................................... 119/14.04
See application file for complete search history.

(56) References Cited

U.S. PATENT DOCUMENTS

| 2,731,300 A | 1/1956 | Jansen .......................... 299/111 |
| 2,830,559 A | 4/1958 | McMurray ..................... 119/159 |

(Continued)

FOREIGN PATENT DOCUMENTS

| AT | 386 922 B | 11/1988 | ................. A01J 7/00 |
| AT | 387 686 B | 2/1989 | ................. A01J 5/01 |

(Continued)

OTHER PUBLICATIONS

Canadian Intellectual Property Office; Office Action for Application No. 2,775,130; 4 pages, Jul. 30, 2013.

(Continued)

*Primary Examiner* — Monica Williams
(74) *Attorney, Agent, or Firm* — Baker Botts L.L.P.

(57) ABSTRACT

A system includes a carriage track positioned adjacent to a rotary milking platform, a robot carriage positioned on the carriage track such that the robot carriage may move along the carriage track, and a controller. The controller determines a movement of a milking stall of the rotary milking platform from a first rotational position to a second rotational position. The controller further determines a position of the robot carriage on the carriage track corresponding to the movement of the milking stall of the rotary milking platform. The controller also communicates a position signal to a carriage actuator coupled to the robot carriage and the carriage track. The position signal causes the carriage actuator to move the robot carriage along the carriage track to the determined position in conjunction with the movement of the rotary milking platform.

20 Claims, 10 Drawing Sheets

Related U.S. Application Data continuation-in-part of application No. 13/095,963, filed on Apr. 28, 2011, now Pat. No. 8,707,905.

(60) Provisional application No. 61/378,871, filed on Aug. 31, 2010.

(51) Int. Cl.
*A01J 5/017* (2006.01)
*A01J 5/003* (2006.01)
*A01J 5/007* (2006.01)

(56) References Cited

U.S. PATENT DOCUMENTS

| | | | |
|---|---|---|---|
| 3,174,457 A | 3/1965 | Lyttle et al. | 119/1 |
| 3,835,814 A | 9/1974 | Jacobs et al. | 119/14.04 |
| 4,306,454 A | 12/1981 | Olrik et al. | 73/224 |
| 4,508,058 A | 4/1985 | Jakobson et al. | 119/14.02 |
| 4,617,876 A | 10/1986 | Hayes | 119/155 |
| 4,726,322 A | 2/1988 | Torsius | 119/14.14 |
| 4,735,172 A | 4/1988 | Wahlström et al. | 119/14.1 |
| 4,819,875 A | 4/1989 | Beal | 239/97 |
| 4,867,103 A | 9/1989 | Montalescot et al. | 119/14.08 |
| 4,941,433 A | 7/1990 | Hanauer | 119/14.02 |
| 5,069,160 A | 12/1991 | Street et al. | 119/14.08 |
| 5,088,447 A | 2/1992 | Spencer et al. | 119/51.02 |
| 5,285,746 A | 2/1994 | Moreau | 119/14.03 |
| 5,379,721 A | 1/1995 | Dessing et al. | 119/14.08 |
| 5,479,876 A | 1/1996 | Street et al. | 119/14.08 |
| 5,553,569 A | 9/1996 | Street et al. | 119/525 |
| 5,596,945 A | 1/1997 | van der Lely | 119/14.03 |
| 5,666,903 A | 9/1997 | Bull et al. | 119/14.01 |
| 5,718,185 A | 2/1998 | Pichler et al. | 119/14.04 |
| 5,722,343 A | 3/1998 | Aurik et al. | 119/14.02 |
| 5,816,190 A | 10/1998 | van der Lely | 119/14.08 |
| 5,862,776 A | 1/1999 | van den Berg | 119/14.1 |
| 5,918,566 A | 7/1999 | van den Berg | 119/14.02 |
| 5,934,220 A | 8/1999 | Hall et al. | 119/14.08 |
| 6,055,930 A | 5/2000 | Stein et al. | 119/14.08 |
| 6,105,536 A | 8/2000 | DeWaard | 119/14.04 |
| 6,167,839 B1 | 1/2001 | Isaksson et al. | 119/14.08 |
| 6,189,486 B1 | 2/2001 | Lindholm | 119/14.02 |
| 6,205,949 B1 | 3/2001 | van den Berg | 119/14.02 |
| 6,213,051 B1 | 4/2001 | Fransen | 119/14.08 |
| 6,227,142 B1 | 5/2001 | Birk | 119/14.08 |
| 6,234,109 B1 | 5/2001 | Andersson et al. | 119/14.08 |
| 6,257,169 B1 | 7/2001 | Oosterling | 119/14.02 |
| 6,321,682 B1 | 11/2001 | Eriksson et al. | 119/14.44 |
| 6,341,575 B1 | 1/2002 | Forsén | 119/14.08 |
| 6,363,883 B1 | 4/2002 | Birk | 119/14.08 |
| 6,401,654 B1 | 6/2002 | Hallsten et al. | 119/14.18 |
| 6,532,892 B1 | 3/2003 | Nilsson | 119/14.03 |
| 6,543,381 B1 | 4/2003 | Birk et al. | 119/14.08 |
| 6,553,942 B1 | 4/2003 | Eriksson | 119/670 |
| 6,568,352 B2 | 5/2003 | Fransen | 119/668 |
| 6,591,784 B1 | 7/2003 | Eriksson | 119/670 |
| 6,626,130 B1 | 9/2003 | Eriksson | 119/670 |
| 6,729,262 B2 | 5/2004 | Ealy et al. | 119/14.08 |
| 6,864,914 B1 | 3/2005 | Birk | 348/211.99 |
| 6,976,644 B2 | 12/2005 | Troudt | 239/587.1 |
| 7,039,220 B2 | 5/2006 | Kriesel | 382/110 |
| 7,128,020 B2 | 10/2006 | Björk et al. | 119/14.18 |
| 7,146,928 B2 | 12/2006 | Ealy et al. | 119/14.08 |
| 7,246,571 B2 | 7/2007 | Van Den Berg et al. | 119/14.08 |
| 7,299,766 B2 | 11/2007 | Van Den Berg et al. | 119/14.02 |
| 7,377,232 B2 | 5/2008 | Holmgren et al. | 119/670 |
| 7,690,327 B2 | 4/2010 | Van Den Berg | 119/14.02 |
| 7,882,802 B2 | 2/2011 | Van Den Berg et al. | 119/14.08 |
| 8,036,429 B2 | 10/2011 | Doyle, II | 382/110 |
| 8,074,600 B2 | 12/2011 | Källén et al. | 119/14.04 |
| 8,210,122 B2 | 7/2012 | Pettersson et al. | 119/14.08 |
| 8,800,487 B2 * | 8/2014 | Hofman | A01J 7/04 |
| | | | 119/14.03 |
| 9,247,709 B2 * | 2/2016 | Hofman | A01J 7/04 |
| 2001/0024514 A1 | 9/2001 | Matsunaga | 382/106 |
| 2002/0108576 A1 | 8/2002 | Lely et al. | 119/14.02 |
| 2003/0097990 A1 | 5/2003 | Bjork et al. | 119/14.08 |
| 2005/0223997 A1 | 10/2005 | Umegard | 119/14.03 |
| 2006/0196431 A1 | 9/2006 | Kaever et al. | 119/14.04 |
| 2007/0137579 A1 | 6/2007 | Osthues et al. | 119/14.03 |
| 2007/0245964 A1 | 10/2007 | Van Den Berg et al. | 119/14.08 |
| 2007/0277737 A1 | 12/2007 | Maier et al. | 119/14.45 |
| 2008/0035063 A1 * | 2/2008 | Birk | A01K 1/126 |
| | | | 119/14.04 |
| 2008/0202432 A1 | 8/2008 | Petterson | |
| 2010/0012039 A1 | 1/2010 | Hallstrom | |
| 2010/0031889 A1 * | 2/2010 | Eriksson | A01K 1/126 |
| | | | 119/14.02 |
| 2010/0095893 A1 | 4/2010 | Kallen et al. | 119/14.04 |
| 2010/0282172 A1 | 11/2010 | Eriksson et al. | 119/14.02 |
| 2010/0288198 A1 | 11/2010 | Liao et al. | |
| 2011/0114024 A1 | 5/2011 | Van Den Berg | 119/14.02 |
| 2011/0239945 A1 | 10/2011 | Van Den Berg | 119/14.02 |
| 2011/0308467 A1 | 12/2011 | Eckhardt | |
| 2012/0000427 A1 | 1/2012 | Nilsson | 119/14.02 |
| 2012/0180729 A1 | 7/2012 | Van Dorp | 119/14.08 |
| 2012/0222622 A1 * | 9/2012 | Hofman | A01J 7/04 |
| | | | 119/14.04 |
| 2013/0239897 A1 * | 9/2013 | Birk | A01J 5/0175 |
| | | | 119/14.04 |
| 2014/0331934 A1 * | 11/2014 | Eriksson | A01K 1/126 |
| | | | 119/14.04 |
| 2015/0264885 A1 * | 9/2015 | van der Sluis | A01J 5/0175 |
| | | | 119/14.04 |

FOREIGN PATENT DOCUMENTS

| | | | | |
|---|---|---|---|---|
| AT | 404 537 B | 12/1998 | | A01J 7/04 |
| AT | 406 108 B | 2/2000 | | A01J 5/00 |
| AU | 2005222545 A1 | 11/2005 | | A01J 5/017 |
| CA | 1 253 956 | 5/1989 | | A01J 7/00 |
| CA | 2 313 533 A1 | 6/1999 | | G06T 1/00 |
| CA | 2 315 018 A1 | 7/1999 | | G06T 1/00 |
| DE | 37 42 867 A1 | 7/1989 | | A01J 5/017 |
| DE | 39 38 077 A1 | 5/1991 | | A01J 5/017 |
| DE | 689 19 414 T3 | 5/1995 | | A01J 5/017 |
| DE | 691 16 926 T2 | 11/1996 | | A01J 5/017 |
| DE | 196 36 551 A1 | 3/1998 | | A01J 5/017 |
| DE | 689 28 489 T2 | 4/1998 | | A01J 5/00 |
| DE | 38 75 414 T3 | 8/1999 | | A01J 5/00 |
| DE | 691 32 321 T2 | 2/2001 | | A01J 5/017 |
| DE | 102 12 676 C1 | 6/2003 | | A01K 1/12 |
| DK | 144542 B | 5/1980 | | A01J 7/00 |
| DK | 147721 B | 7/1981 | | A01J 5/04 |
| DK | 218482 A | 11/1983 | | A01J 5/10 |
| DK | 328482 A | 1/1984 | | A01J 7/00 |
| DK | 169247 B1 | 9/1994 | | A01J 5/00 |
| DK | 173139 B1 | 6/1998 | | A01J 5/04 |
| EP | 0 188 303 A1 | 7/1986 | | A01J 7/00 |
| EP | 0 209 202 A1 | 1/1987 | | A01J 7/00 |
| EP | 0 229 682 A1 | 7/1987 | | A01J 7/00 |
| EP | 0 232 568 A1 | 8/1987 | | G01S 15/88 |
| EP | 0 119 222 B1 | 4/1988 | | A01J 5/04 |
| EP | 0 300 582 A1 | 1/1989 | | A01J 7/00 |
| EP | 0 306 579 A1 | 3/1989 | | A01J 5/017 |
| EP | 0 309 036 A1 | 3/1989 | | A01J 7/00 |
| EP | 0 327 037 A2 | 8/1989 | | A01M 7/00 |
| EP | 0 329 248 A1 | 8/1989 | | A01J 7/00 |
| EP | 0 349 019 A2 | 1/1990 | | A01J 5/08 |
| EP | 0 360 354 A1 | 3/1990 | | A01J 7/00 |
| EP | 0 432 148 A2 | 6/1991 | | A01K 1/12 |
| EP | 0 440 313 A2 | 8/1991 | | G01S 15/42 |
| EP | 0 448 132 A2 | 9/1991 | | A01J 7/00 |
| EP | 0 455 305 A1 | 11/1991 | | G01S 7/48 |
| EP | 0 467 489 A1 | 1/1992 | | A01J 7/00 |
| EP | 0 472 247 A2 | 2/1992 | | A01J 7/00 |
| EP | 0 479 397 A2 | 4/1992 | | A01J 7/00 |
| EP | 0 511 722 A2 | 11/1992 | | A01D 7/00 |
| EP | 0 511 723 A2 | 11/1992 | | A01D 7/00 |
| EP | 0 516 246 A2 | 12/1992 | | A01D 7/00 |
| EP | 0 541 517 A2 | 5/1993 | | A01J 7/00 |
| EP | 0 545 916 A2 | 6/1993 | | A01J 7/00 |
| EP | 0 548 058 A2 | 6/1993 | | A01K 1/12 |
| EP | 0 553 940 A2 | 8/1993 | | A01J 7/00 |

(56) References Cited

FOREIGN PATENT DOCUMENTS

| | | | | |
|---|---|---|---|---|
| EP | 0 565 189 A2 | 10/1993 | | A01J 7/00 |
| EP | 0 574 089 A2 | 12/1993 | | G01S 7/48 |
| EP | 0 630 558 A2 | 12/1994 | | A01J 7/00 |
| EP | 0 634 097 A1 | 1/1995 | | A01K 1/12 |
| EP | 0 643 907 A2 | 3/1995 | | A01J 7/00 |
| EP | 0 688 498 A2 | 12/1995 | | A01J 7/00 |
| EP | 0 689 762 A1 | 1/1996 | | A01K 1/12 |
| EP | 0 779 025 A2 | 6/1997 | | A01J 5/017 |
| EP | 0 789 995 A1 | 8/1997 | | A01J 7/04 |
| EP | 0 824 857 A1 | 2/1998 | | A01J 5/017 |
| EP | 0 880 889 A2 | 12/1998 | | A01J 5/017 |
| EP | 0 900 522 A1 | 3/1999 | | A01J 5/017 |
| EP | 0 951 651 B1 | 10/1999 | | G01S 17/00 |
| EP | 1 089 614 B1 | 4/2001 | | A01J 7/02 |
| EP | 1 211 928 B1 | 6/2002 | | A01J 5/017 |
| EP | 1 253 440 A1 | 10/2002 | | G01S 7/481 |
| EP | 1 316 253 A2 | 11/2002 | | A01K 1/12 |
| EP | 1 279 327 A2 | 1/2003 | | A01J 5/017 |
| EP | 1 388 281 A1 | 2/2004 | | A01J 7/02 |
| EP | 1 447 002 A1 | 8/2004 | | A01J 5/017 |
| EP | 1 460 453 A1 | 9/2004 | | G01S 17/89 |
| EP | 1 520 468 A1 | 4/2005 | | A01J 7/04 |
| EP | 1 537 774 A1 | 6/2005 | | A01J 5/017 |
| EP | 1 537 775 A1 | 6/2005 | | A01J 5/017 |
| EP | 1 523 882 A2 | 3/2009 | | A01K 1/12 |
| EP | 2 241 179 A1 | 10/2010 | | A01K 1/12 |
| ES | 2 064 892 T3 | 2/1995 | | A01J 5/017 |
| FI | 88099 B | 12/1992 | | A01J 7/00 |
| FI | 20002169 A | 4/2002 | | A01J 5/01 |
| FR | 2 595 197 A1 | 9/1987 | | A01J 5/017 |
| GB | 2 184 233 A | 6/1987 | | G01N 21/89 |
| GB | 2 218 888 A | 11/1989 | | A01J 7/00 |
| JP | 62-159078 A | 7/1987 | | A01J 5/00 |
| JP | 9-196631 A | 7/1997 | | G01B 11/00 |
| JP | 9-243315 A | 9/1997 | | A01J 5/00 |
| JP | 9-275834 A | 10/1997 | | A01J 5/00 |
| JP | 9-285234 A | 11/1997 | | A01J 5/00 |
| JP | 11-276002 A | 10/1999 | | A01J 5/00 |
| JP | 11-281340 A | 10/1999 | | A01J 5/00 |
| JP | 2001-504944 A | 4/2001 | | A01J 5/00 |
| JP | 2002-521007 A | 7/2002 | | A01J 5/00 |
| JP | 2002-253075 A | 9/2002 | | A01J 5/00 |
| NL | 8502039 A | 2/1987 | | A01J 5/017 |
| NL | 8503580 A | 7/1987 | | A01J 5/00 |
| NL | 8600076 A | 8/1987 | | A01J 5/00 |
| NL | 8602699 A | 5/1988 | | A01J 5/017 |
| NL | 8800042 A | 8/1989 | | A01J 5/017 |
| NL | 8801785 A | 2/1990 | | A01J 5/017 |
| NL | 9101088 A | 1/1993 | | A01J 7/00 |
| NL | 9201434 A | 3/1994 | | A01J 5/017 |
| NL | 9201902 A | 6/1994 | | A01J 5/017 |
| NL | 9400220 A | 9/1995 | | A01J 5/017 |
| NL | 9400471 A | 11/1995 | | A01J 5/017 |
| NL | 9500276 A | 9/1996 | | A01J 5/017 |
| NL | 9500277 A | 9/1996 | | A01J 5/017 |
| NL | 9500363 A | 10/1996 | | A01J 5/017 |
| NL | 9500566 A | 11/1996 | | A01J 5/01 |
| NL | 1 009 632 C2 | 7/1998 | | A01J 5/017 |
| NL | 1006804 C2 | 2/1999 | | A01J 5/00 |
| NL | 1009711 C2 | 1/2000 | | A01J 5/00 |
| NL | 1013026 C2 | 3/2001 | | A01J 5/017 |
| NL | 1018563 C1 | 1/2003 | | A01J 5/017 |
| SE | 419 901 B | 8/1981 | | A01J 7/00 |
| SE | 425 821 B | 11/1982 | | A01J 7/00 |
| SE | 433 553 B | 6/1984 | | A01J 5/10 |
| SE | 512 334 C2 | 2/2000 | | A01J 5/017 |
| WO | WO 96/20587 A1 | 7/1996 | | A01J 5/017 |
| WO | WO 97/15183 A1 | 5/1997 | | A01J 5/017 |
| WO | WO 97/15901 A1 | 5/1997 | | G06T 7/00 |
| WO | WO 97/37528 A1 | 10/1997 | | A01J 5/017 |
| WO | WO 98/01022 A1 | 1/1998 | | A01J 5/017 |
| WO | WO 98/35547 A1 | 8/1998 | | A01J 5/017 |
| WO | WO 98/44782 A1 | 10/1998 | | A01J 5/017 |
| WO | WO 98/45808 A1 | 10/1998 | | G06T 1/00 |
| WO | WO 98/47348 A1 | 10/1998 | | A01J 5/017 |
| WO | WO 99/09430 A2 | 2/1999 | | G01S 17/00 |
| WO | WO 99/30277 A1 | 6/1999 | | G06T 1/00 |
| WO | WO 99/33020 A1 | 7/1999 | | G06T 1/00 |
| WO | WO 00/04763 A1 | 2/2000 | | A01J 5/017 |
| WO | WO 00/04765 A1 | 2/2000 | | A01J 5/017 |
| WO | WO 00/11935 A1 | 3/2000 | | A01J 5/017 |
| WO | WO 00/11936 A1 | 3/2000 | | A01J 5/017 |
| WO | WO 00/11940 A1 | 3/2000 | | A01K 11/00 |
| WO | WO 00/62602 A1 | 10/2000 | | A01J 5/017 |
| WO | WO 01/19171 A1 | 3/2001 | | A01J 5/017 |
| WO | WO 01/19172 A1 | 3/2001 | | A01J 5/017 |
| WO | WO 01/52633 A1 | 7/2001 | | A01J 5/017 |
| WO | WO 02/00011 A1 | 1/2002 | | A01J 5/017 |
| WO | WO 02/07098 A1 | 1/2002 | | G06T 7/00 |
| WO | WO 02/15676 A1 | 2/2002 | | A01J 5/017 |
| WO | WO 02/082201 A1 | 10/2002 | | G05D 1/02 |
| WO | WO 03/055297 A1 | 7/2003 | | A01J 5/017 |
| WO | WO 2005/015985 A2 | 2/2005 | | |
| WO | WO 2006/038840 A1 | 4/2006 | | A01K 1/12 |
| WO | WO 2007/050012 A1 | 5/2007 | | A01J 5/017 |
| WO | WO 2008/030085 A1 | 3/2008 | | A01J 5/017 |
| WO | WO 2008/030116 A1 | 3/2008 | | A01K 1/12 |
| WO | WO 2008/058723 A1 | 5/2008 | | A01J 7/02 |
| WO | WO 2008/118068 A1 | 10/2008 | | A01K 1/12 |
| WO | WO 2009/093965 A1 | 7/2009 | | A01J 5/017 |
| WO | WO 2010/012625 A2 | 2/2010 | | A01J 5/017 |
| WO | WO 2010/014002 A9 | 2/2010 | | A01K 1/12 |
| WO | WO 2010/046669 A1 | 4/2010 | | A01J 5/017 |
| WO | WO 2010/110663 A1 | 9/2010 | | A01J 5/017 |
| WO | WO 2011/023620 A2 | 3/2011 | | A01J 5/017 |
| WO | WO 2011/098454 | 8/2011 | | A01K 1/12 |
| WO | WO 2011/098994 A2 | 8/2011 | | A01K 5/017 |
| WO | WO 2011/102717 A1 | 8/2011 | | A01K 1/12 |
| WO | WO 2011/117386 A2 | 9/2011 | | A01J 5/00 |

OTHER PUBLICATIONS

European Communication with European Search Report, for Application No. 14165158.8-1656, 5 pages, Jul. 15, 2014.
PCT Notification of Transmittal of the International Search Report and the Written Opinion of the International Searching Authority for Application No. PCT/US2012/035074; 19 pages, Dec. 12, 2012.
Canadian Intellectual Property Office; Office Action for Application No. 2,775,177; 3 pages, Nov. 27, 2012.
Canadian Intellectual Property Office; Office Action for Application No. 2,783,887; 2 pages, Oct. 1, 2012.
Canadian Intellectual Property Office; Office Action for Application No. 2,784,070; 3 pages, Oct. 1, 2012.
PCT Notification of Transmittal of the International Search Report and the Written Opinion of the International Searching Authority for International Application No. PCT/US2012/035107; 28 pages, Oct. 16, 2012.
U.S. Appl. No. 13/448,840, filed Apr. 17, 2012, Henk Hofman.
U.S. Appl. No. 13/448,873, filed Apr. 17, 2012, Henk Hofman.
U.S. Appl. No. 13/448,882, filed Apr. 17, 2012, Henk Hofman.
U.S. Appl. No. 13/448,913, filed Apr. 17, 2012, Henk Hofman.
U.S. Appl. No. 13/448,929, filed Apr. 17, 2012, Henk Hofman.
U.S. Appl. No. 13/448,951, filed Apr. 17, 2012, Henk Hofman.
U.S. Appl. No. 13/448,993, filed Apr. 17, 2012, Henk Hofman.
U.S. Appl. No. 14/449,002, filed Apr. 17, 2012, Henk Hofman.
U.S. Appl. No. 13/449,056, filed Apr. 17, 2012, Henk Hofman.
U.S. Appl. No. 13/449,105, filed Apr. 17, 2012, Henk Hofman.
U.S. Appl. No. 13/449,142, filed Apr. 17, 2012, Henk Hofman.
U.S. Appl. No. 13/449,162, filed Apr. 17, 2012, Henk Hofman.
U.S. Appl. No. 13/449,173, filed Apr. 17, 2012, Henk Hofman.
U.S. Appl. No. 13/449,951, filed Apr. 18, 2012, Henk Hofman.
U.S. Appl. No. 13/451,248, filed Apr. 19, 2012, Henk Hofman.
U.S. Appl. No. 13/454,281, filed Apr. 24, 2012, Henk Hofman.
U.S. Appl. No. 13/454,298, filed Apr. 24, 2012, Henk Hofman.
U.S. Appl. No. 13/454,351, filed Apr. 24, 2012, Henk Hofman.
U.S. Appl. No. 13/454,386, filed Apr. 24, 2012, Henk Hofman.
U.S. Appl. No. 13/454,490, filed Apr. 24, 2012, Henk Hofman.
U.S. Appl. No. 13/454,670, filed Apr. 24, 2012, Henk Hofman.
U.S. Appl. No. 13/454,716, filed Apr. 24, 2012, Henk Hofman.
U.S. Appl. No. 13/454,833, filed Apr. 24, 2012, Henk Hofman.

(56) References Cited

OTHER PUBLICATIONS

U.S. Appl. No. 13/454,876, filed Apr. 24, 2012, Henk Hofman.
U.S. Appl. No. 13/454,913, filed Apr. 24, 2012, Henk Hofman.
U.S. Appl. No. 13/454,953, filed Apr. 24, 2012, Henk Hofman.
U.S. Appl. No. 13/454,975, filed Apr. 24, 2012, Henk Hofman.
Jan W. Weingarten, et al.; *A State-of-the-Art 3D Sensor for Robot Navigation*; 6 pages, Sep. 2004.
PCT International Patent Application No. PCT/NL2010/050154 entitled *Robot and Method for Milking a Cow by this Robot*; 19 pages, Mar. 25, 2010.
PCT Notification of Transmittal of the International Search Report and the Written Opinion of the International Searching Authority for Application No. PCT/US2011/047510; 9 pages, Jan. 2, 2012.
PCT Notification of Transmittal of the International Search Report and the Written Opinion of the International Searching Authority for Application No. PCT/US2011/047511; 9 pages, Jan. 2, 2012.
PCT Notification of Transmittal of the International Search Report and the Written Opinion of the International Searching Authority for Application No. PCT/US2012/033894; 11 pages, Jul. 23, 2012.
PCT Invitation to Pay Additional Fees and, Where Applicable, Protest Fee and Partial National Search Report for Application No. PCT/US2012/035077; 7 pages, Jul. 25, 2012.
PCT Invitation to Pay Additional Fees and, Where Applicable, Protest Fee and Partial National Search Report for Application No. PCT/US2012/035079; 8 pages, Jul. 31, 2012.
PCT Notification of Transmittal of the International Search Report and the Written Opinion of the International Searching Authority for Application No. PCT/US2012/033892; 13 pages, Jul. 31, 2012.
PCT Notification of Transmittal of the International Search Report and the Written Opinion of the International Searching Authority for .Application No. PCT/US2012/035356; 14 pages, Jul. 31, 2012.
PCT Invitation to Pay Additional Fees and, Where Applicable, Protest Fee and Partial National Search Report for Application No. PCT/US2012/035107; 7 pages, Jul. 31, 2012.
PCT Invitation to Pay Additional Fees and, Where Applicable, Protest Fee/Partial International Search Report for International Application No. PCT/US2012/035074; 7 pages, Jul. 16, 2012.
First Examination Report from New Zealand Intellectual Property Office, IP No. 605830, 2 pages, Oct. 25, 2013.
Canadian Intellectual Property Office; Office Action for Application No. 2,775,169; 3 pages, Aug. 20, 2012.
Canadian Intellectual Property Office; Office Action for Application No. 2,775,177; 2 pages, Aug. 20, 2012.
Canadian Intellectual Property Office; Office Action for Application No. 2,775,252; 3 pages, Aug. 21, 2012.
Canadian Intellectual Property Office; Office Action for Application No. 2,775,130; 2 pages, Aug. 20, 2012.
Canadian Intellectual Property Office, Office Action for Application No. 2,775,132 3 pages, Aug. 20, 2012.

\* cited by examiner

SYSTEM AND METHOD FOR CONTROLLING THE POSITION OF A ROBOT CARRIAGE BASED ON THE POSITION OF A MILKING STALL OF AN ADJACENT ROTARY MILKING PLATFORM

RELATED APPLICATIONS

This application is a continuation of U.S. Ser. No. 14/329,399, filed Jul. 11, 2014 entitled "System and Method for Controlling the Position of a Robot Carriage Based on the Position of Milking Stall of an Adjacent Rotary Milking Platform" which is a continuation of Ser. No. 13/448,897, filed Apr. 17, 2012, which is now U.S. Pat. No. 8,800,487 issued Aug. 12, 2014, which is a continuation-in-part application of U.S. patent application Ser. No. 13/095,963 entitled "Automated System for Applying Disinfectant to the Teats of Dairy Livestock", filed Apr. 28, 2011, which is now U.S. Pat. No. 8,707,905 issued Apr. 29, 2014, which claims the benefit under 35 U.S.C. §119(e) of the priority of U.S. Provisional Application Ser. No. 61/378,871 entitled "Automated System for Applying Disinfectant to the Teats of Dairy Livestock", filed Aug. 31, 2010.

TECHNICAL FIELD

This invention relates generally to dairy farming and more particularly to a system and method for controlling the position of a robot carriage based on the position of a milking stall of an adjacent rotary milking platform.

BACKGROUND

Over time, the size and complexity of dairy milking operations has increased. Accordingly, the need for efficient and scalable systems and methods that support dairy milking operations has also increased. Systems and methods supporting dairy milking operations, however, have proven inadequate in various respects.

SUMMARY

According to embodiments of the present disclosure, disadvantages and problems associated with previous systems supporting dairy milking operations may be reduced or eliminated.

In certain embodiments, a system includes a carriage track positioned adjacent to a rotary milking platform, a robot carriage mounted to the carriage track such that the robot carriage may move linearly along the carriage track, and a controller. The controller is operable to receive both a first rotary encoder signal indicating a first rotational position of a milking stall of the rotary milking platform (a position corresponding to a starting linear position of the robot carriage on the carriage track) and a second rotary encoder signal indicating a second rotational position of the milking stall of the rotary milking platform. The controller is further operable to determine, based on a difference between the second rotary encoder signal and the first rotary encoder signal, a desired linear position of the robot carriage on the carriage track, the desired linear position being a position corresponding to the second rotational position of the milking stall of the rotary milking platform. The controller is further operable to communicate a position signal to a carriage actuator coupled to the robot carriage and the carriage track, the position signal causing the carriage actuator to move the robot carriage along the carriage track to the desired linear position.

In certain embodiments, a method includes receiving both a first rotary encoder signal indicating a first rotational position of a milking stall of a rotary milking platform (a position corresponding to a starting linear position of a robot carriage on an adjacent carriage track) and a second rotary encoder signal indicating a second rotational position of the milking stall of the rotary milking platform. The method further includes determining, based on a difference between the second rotary encoder signal and the first rotary encoder signal, a desired linear position of the robot carriage on the carriage track, the desired linear position being a position corresponding to the second rotational position of the milking stall of the rotary milking platform. The method further includes communicating a position signal to a carriage actuator coupled to the robot carriage and the carriage track, the position signal causing the carriage actuator to move the robot carriage along the carriage track to the desired linear position.

Particular embodiments of the present disclosure may provide one or more technical advantages. For example, certain embodiments of the present disclosure may provide a system that allows a robot carriage mounted on a linear carriage track to accurately track the movement of a milking stall of an adjacent rotary milking platform. Because the robot carriage may carry an automated system for performing one or more functions associated with the milking of a dairy livestock located in the milking stall of the rotary milking platform (e.g., a robotic arm for applying disinfectant to the teats of the dairy livestock and/or attaching a milking claw to the teats of the dairy livestock), certain embodiments of the present disclosure may facilitate a reduction in the need for human labor to perform certain functions associated with milking dairy livestock using a rotary milking platform. As a result, certain embodiments of the present disclosure may reduce the cost associated with certain dairy milking operations. In addition, the automation facilitated by certain embodiments of the present disclosure may increase the throughput of the rotary milking platform, thereby increasing the overall milk production of the rotary milking platform.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION

Figure 1:
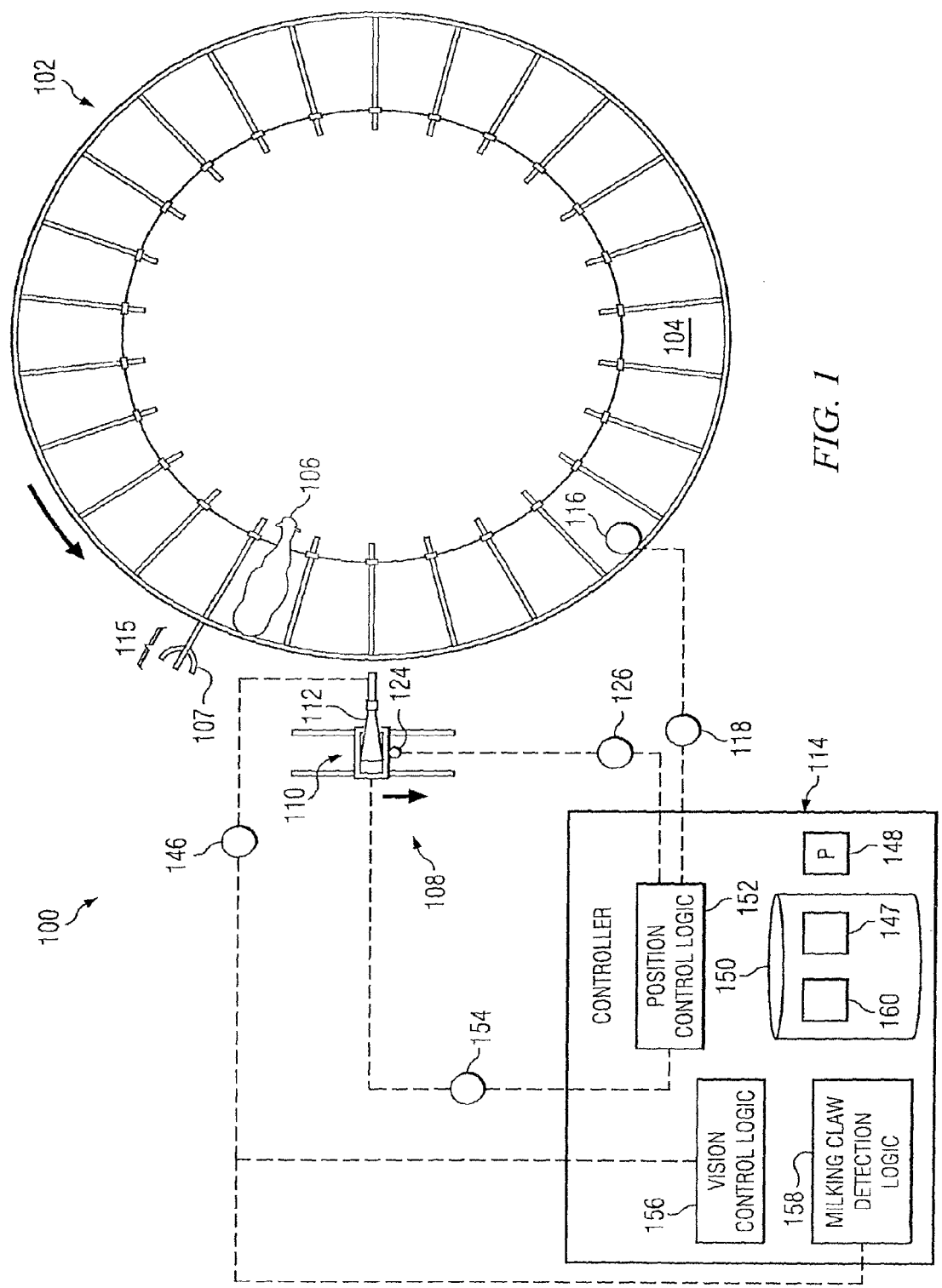
FIG. 1 illustrates an example rotary milking system, according to certain embodiments of the present disclosure.

FIG. 1 illustrates an example rotary milking system 100, according to certain embodiments of the present disclosure. System 100 includes a rotary milking platform 102 having a number of stalls 104 each configured to hold a dairy cow 106. In order to facilitate the milking of a dairy cow 106, each stall 104 may have an associated milking claw 107 configured for attachment to the teats of the dairy cow 106 located in the milking stall 104. System 100 further includes a track 108 and a robot carriage 110 carrying a robot arm 112, robot carriage 110 being mounted on track 108 such that robot carriage 110 is able to translate laterally along track 108. System 100 further includes a controller 114 operable to control the movement of robot carriage 110 along track 108 and/or the movement of the robot arm 112 mounted to robot carriage 110.

In certain embodiments, rotary milking system 100 may facilitate the performance of one or more operations associated with the milking of a dairy cow 106 located in a milking stall 104 of rotary milking platform 102. As particular examples, rotary milking system 100 may facilitate (1) the cleaning and/or stimulation of the teats of a dairy cow 106 prior to the attachment of teat cups of a milking claw to the teats of the dairy cow 106 (e.g., using a preparation tool of robot arm 112), (2) the attachment of the teat cups of the milking claw 107 to the teats of a dairy cow 106 (e.g., using a teat cup attacher of robot arm 112), and/or (3) the application of disinfectant to the teats of a dairy cow 106 (e.g., using a spray tool of robot arm 112).

In association with the performance of one or more of the above-described operations associated with the milking of a dairy cow 106, controller 114 may perform a number of functions. First, controller 114 may control the movement of robot carriage 110 along track 108 such that robot carriage 110 moves along track 108 at a rate corresponding to the rotational speed of rotary milking platform 102. As a result, one or more of the above-described operations may be performed while rotary milking platform 102 is in motion. Second, controller 114 may determine whether enough space exists between the legs of a dairy cow 106 (e.g., based on image signal(s) 146 generated by vision system 142, as described in detail below) to allow a portion of robot arm 112 to extend between the legs and perform one or more of the above-described operations. Third, controller 114 may confirm that the milking claw is detached from the teats of the dairy cow 106 prior to causing a portion of robot arm 112 to extend between the legs of the dairy cow 106 (as one or more of the above-described operations may be performed subsequent to milking of the dairy cow 106).

Although a particular implementation of system 100 is illustrated and primarily described, the present disclosure contemplates any suitable implementation of system 100, according to particular needs. Additionally, although the present disclosure is described with regard to the milking of dairy cows 106, the present disclosure contemplates that system 100 may be applicable to the milking of any suitable dairy livestock (e.g., cows, goats, sheep, water buffalo, etc.).

Rotary milking platform 102 may include any suitable combination of structure and materials forming a platform with a number of stalls 104 positioned around the perimeter such that the stalls 104 rotate about a center point as dairy cows 106 in stalls 104 are milked. In the depicted embodiment, milking stalls 104 are arranged in a side-by-side configuration such that a dairy cow 106 in a milking stall 104 faces the middle of rotary milking platform 102. In this configuration, robot arm 112 may extend and retract from between the hind legs of a dairy cow 106 in order to perform one or more operations associated with the milking of the dairy cow 106. Each milking stall may 104 may have an associated milking claw 107 configured for attachment to the teats of a dairy cow 106 in order to facilitate the milking of a dairy cows 106 in the milking stall 104. The milking claw 107 may be stored at a storage location 115 in or adjacent to the associated milking stall 104 when the milking claw is not is use (i.e., when it is not attached to the teats of a dairy cow 106).

Although a rotary milking platform 102 having a particular configuration, size, and number of stalls 104 is illustrated, the present disclosure contemplates a rotary milking platform 102 having any suitable configuration, size, and number of stalls 104, according to particular needs. For example, in one alternative configuration, milking stalls 104 of rotary milking platform 102 may be arranged in a herringbone configuration (where the milking stalls 104 are oriented on a bias relative to the perimeter of milking platform 102). In this configuration, robot arm 112 may extend and retract from the side of the dairy cow 106 (i.e., between a front leg and a hind leg of a dairy cow 106) in order to perform one or more operations associated with the milking of the dairy cow 106. In another alternative configuration, milking stalls 104 of rotary milking platform 102 may be arranged in a tandem configuration (where the front of a dairy cow 106 in a first milking stall 104 is facing the rear of a dairy cow 106 in an adjacent milking stall 104), and robot arm 112 may extend and retract from the side of the dairy cow 106 (i.e. between a front leg and a hind leg).

Figure 2A:
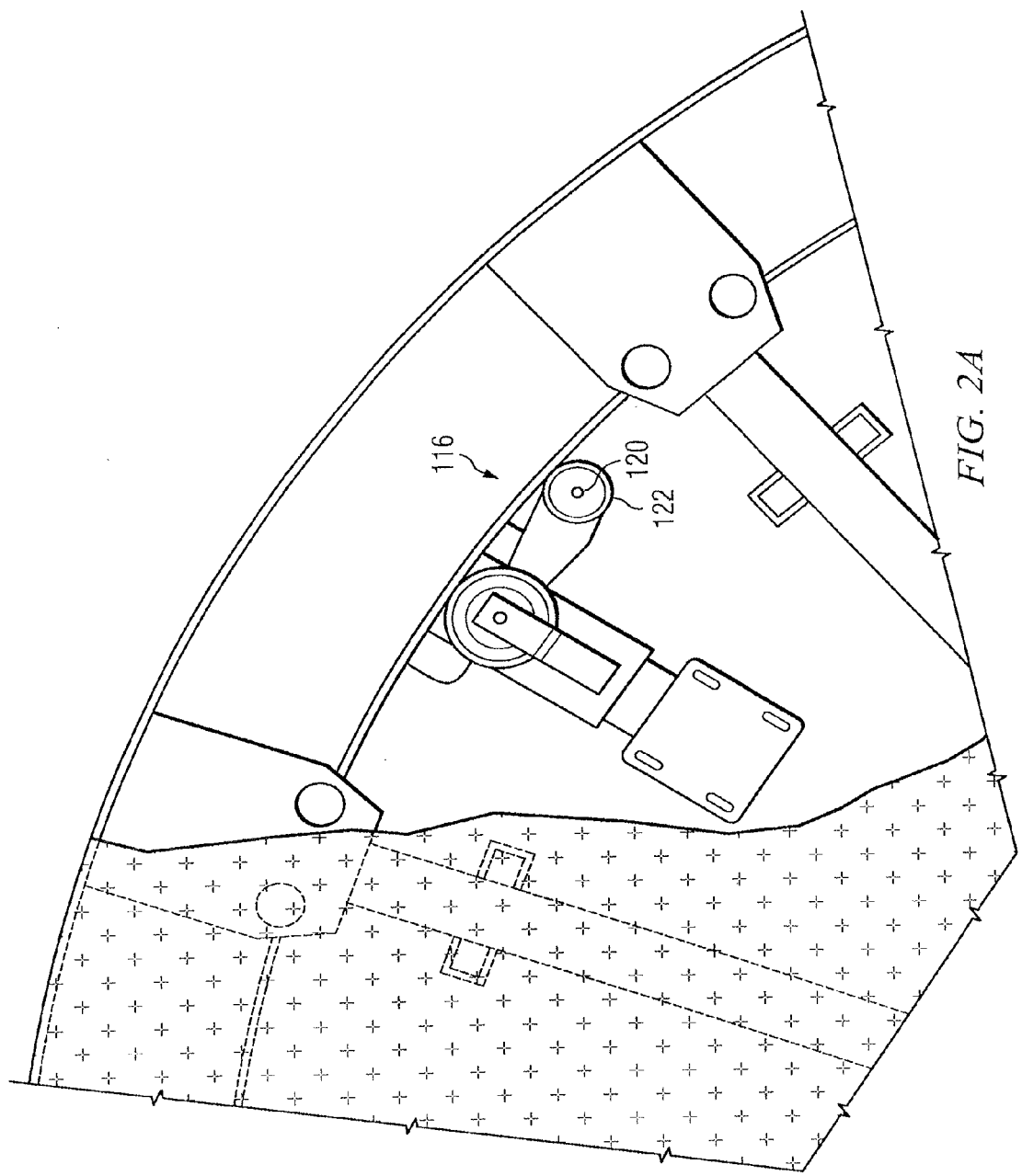
FIG. 2A-2B illustrate top and perspective views of an example rotary encoder of the system depicted in FIG. 1, according to certain embodiments of the present disclosure.
Figure 2B:
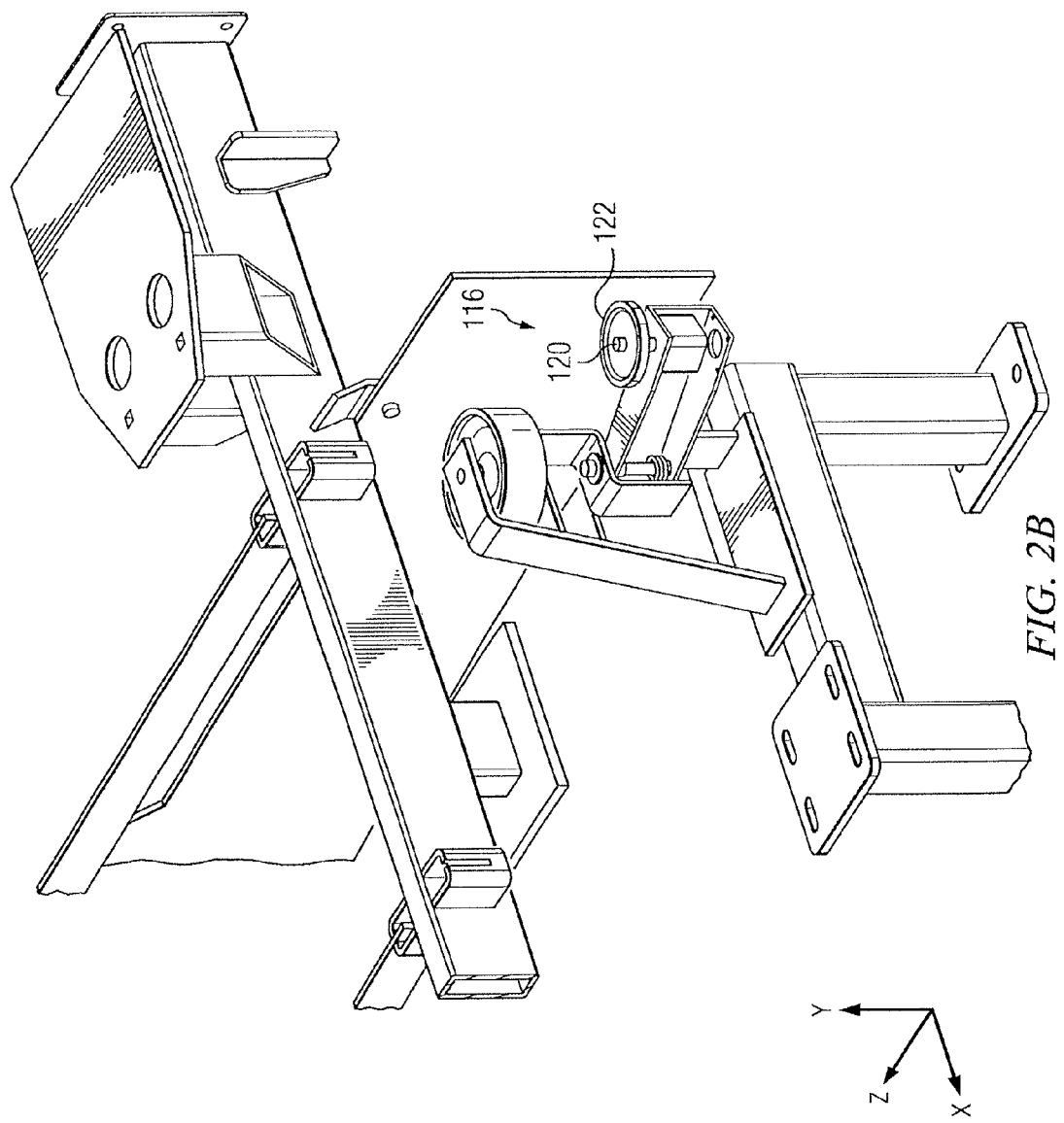

In certain embodiments, a rotary encoder 116 may be configured to generate rotary encoder signals 118 corresponding to the rotational position and/or speed of rotary milking platform 102. As illustrated in detail in FIGS. 2A-2B, rotary encoder 116 may be positioned relative to rotary milking platform 102 such that a rotary encoder wheel 120 contacts at least a portion of rotary milking platform 102. Rotary encoder wheel 120 may contact any suitable portion of rotary milking platform 102 such that rotation of rotary milking platform 102 causes rotation of rotary encoder wheel 120. For example, rotary encoder wheel 120 may contact an inner (or outer) portion of a circular band located beneath the floor of stalls 104 near the outer edge of rotary milking platform 102.

In certain embodiments, rotary encoder 116 may comprise any suitable electro-mechanical device operable to convert an angular position of a shaft 122 into an electrical signal comprising a number of pulses (i.e., rotary encoder signals 118). Because the number of pulses generated by rotary encoder 116 per revolution of rotary milking platform 102 may be known (e.g., 1000 pulses), the pulse count generated by rotary encoder 116 at any given time may correspond to the rotational position of rotary milking platform 102. Similarly, the frequency of pulses of generated by rotary encoder 116 may correspond to the rotational speed of rotary milking platform 102.

Returning to FIG. 1, track 108 may be positioned adjacent to rotary milking platform 102 and may include any suitable combination of structure and materials facilitating the attachment of robot carriage 110 thereto such that robot carriage 110 may move along track 108 adjacent to a rotary milking platform 102. In one embodiment, track 108 comprises straight rails positioned parallel to one another and the robot carriage translates laterally along track 108 tangent to rotary milking platform 102. In another embodiment, track 108 may comprise curved rails. Movement of carriage 110 tangent to rotary milking platform 102 may allow the robot arm 112 riding on carriage 110 to track the movement of a dairy cow 106 located in a milking stall 104 of the rotary milking platform 102. As a result, the robot arm 112 may perform one or more automated functions associated with the milking of the dairy cow 106. For example, the robot arm 112 may comprise a spray tool for applying disinfectant to the teats of the dairy cow 106. As another example, the robot arm 112 may comprise a preparation tool for cleaning and/or stimulating the teats of the dairy cow 106 prior to the attachment of the teat cups of a milking claw 107. As yet another example, the robot arm 112 may comprise teat cup attacher for attaching the teat cups of milking claw 107 to the teats of the dairy cow 106. Although system 100 is primarily described as being used in conjunction with milking stalls 104 of a rotary milking platform 102 throughout the remainder of this description, the present disclosure contemplates system 100 being used in conjunction with any suitable type of milking stall, according to particular needs.

In certain embodiments, an absolute encoder 124 may be coupled to robot carriage 110 and may be configured to generate absolute encoder signals 126 corresponding to the linear position and/or speed of robot carriage 110 on track 108. For example, absolute encoder 124 may have a structure and operation similar to rotary encoder 116 (discussed above). Because absolute encoder 124 may generate a known number of pulses per distance (e.g., meter) traveled by robot carriage 110, the count of pulses generated by absolute encoder 124 at any given time may correspond to the linear position of robot carriage 110 on track 108. Similarly, the frequency of pulses generated by absolute encoder 124 may correspond to the linear speed of robot carriage 110 relative to track 108.

Figure 3:
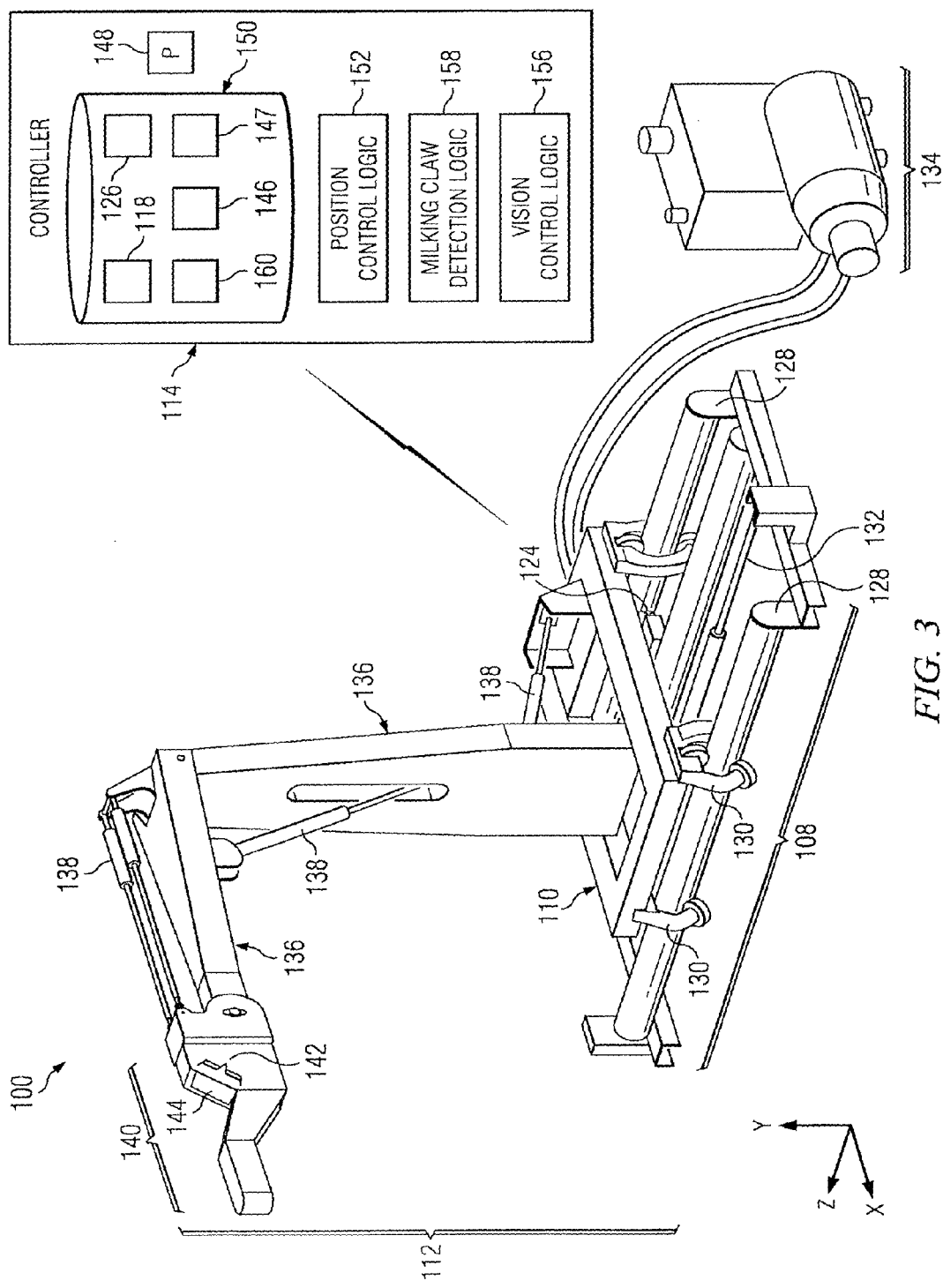
FIG. 3 illustrates a detailed view of an example track, robot carriage, and robot arm of the system depicted in FIG. 1, according to certain embodiments of the present disclosure.

FIG. 3 illustrates a detailed view of an example track 108, robot carriage 110, and robot arm 112 of system 100. In the illustrated example, track 108 includes one or more tubular track members 128 each corresponding to one or more rollers 130 of robot carriage 110. Rollers 130 of robot carriage 110 may roll along track members 128, permitting robot carriage 110 to translate laterally along track 108. In certain embodiments, a carriage actuator 132 may be attached to both track 108 and robot carriage 110 such that extension/retraction of carriage actuator 132 causes movement of robot carriage 110 along track 108. The extension/retraction of carriage actuator 132 may be governed by an actuator drive mechanism 134, which may include a hydraulic pump, a pneumatic pump, or any other suitable drive mechanism operable to cause extension/retraction of carriage actuator 132.

In certain embodiments, the robot arm 112 riding on robot carriage 110 may include a number of arm members 136 pivotally attached to one another. Robot arm 112 may additionally include a number of arm actuators 138 each operable to extend and retract in order to cause movement of robot arm 112. The extension/retraction of arm actuators 138 may be governed by actuator drive mechanism 134, described above. Robot arm 112 may additionally include a tool attachment 140 operable to perform one or more functions associated with the milking of a dairy cow 106. For example, tool attachment 140 may comprise a spray head operable to apply disinfectant to the teats of a dairy cow 106. As another example, tool attachment 140 may comprise a preparation tool for cleaning and/or stimulating the teats of the dairy cow 106 prior to the attachment of the teat cups of a milking claw 107. As yet another example, tool attachment 140 may comprise a teat cup attacher operable to attach the teat cups of a milking claw 107 to the teats of a dairy cow 106.

In certain embodiments, tool attachment 140 may include a vision system 142 housing a camera 144. Camera 144 may include any suitable camera operable to generate one or more image signals 146 corresponding to all or a portion of a milking stall 104 and/or all or a portion of a dairy cow 106 located in the milking stall 104. In some embodiments, camera 144 may be operable to generate still images at particular points in time. In other embodiments, camera 144 may be operable to generate a continuous video image signal. As one particular example, camera 144 may be a three-dimensional camera operable to generate a three-dimensional video image signal 146 corresponding to the rear of a dairy cow 106.

As described in further detail below, image signals 146 generated by vision system 142 (1) may be used by controller 114 (e.g., using vision control logic 156, described below) to position all or a portion of robot arm 112 relative to a dairy cow 106 such that tool attachment 140 may perform one or more of the above-described functions (e.g., by determining whether enough space exists between the hind legs of the dairy cow 106 to allow the extension of at least a portion of robot arm 112 between the hind legs), and/or (2) may be used by controller 114 (e.g., using milking claw detection logic 158, described below) to determine whether a milking claw 107 is attached to the teats of dairy cow 106 in milking stall 104 (as it may be desirable to confirm that the milking claw 107 is not attached to the teats of the dairy cow 106 before robot arm 112 performs certain functions associated with the milking of dairy cow 106).

Although track 108, robot carriage 110, robot arm 112, and tool attachment 140 are depicted as having a particular configuration, the present disclosure contemplates these components having any suitable configuration, according to particular needs. Furthermore, although robot arm 112 is depicted as having a particular number of members 136 having a particular structure, the present disclosure contemplates any suitable number of members 136, each having any suitable structure, according to particular needs. Moreover, although robot arm 112 is depicted as having a particular tool attachment 140, the present disclosure contemplates robot arm 112 having any suitable tool attachment 140 for performing operations associated with the milking of a dairy cow 106.

Returning to FIG. 1, various components of system 100 (e.g., rotary encoder 116, absolute encoder 124, carriage actuator 132, tool attachment 140, and/or vision system 142) may be communicatively coupled to controller 114 (e.g., via a network facilitating wireless or wireline communication). Controller 114 may control the position of robotic carriage 110 on track 108 (e.g., by controlling the extension/retraction of carriage actuator 132) such that robot carriage 110 may track the movement of a stall 104 of rotary milking platform 102. As a result, the robot arm 112 riding on robot carriage 110 may perform one or more functions associated with the milking of a dairy cow 106 located in the stall 104. In addition, controller 114 may process image signals 146 generated by vision system 142 in order to position all or a portion of robot arm 112 relative to a dairy cow 106 in a milking stall 104 such that tool attachment 140 may perform one or more functions associated with the milking of the dairy cow 106. Further, controller 114 may process image signals 146 generated by vision system 142 in order to determine whether to extend robot arm 112 between the hind legs of a dairy cow 106 based on whether a milking claw 107 is attached to the teats of the dairy cow 106.

Controller 114 may include one or more computer systems at one or more locations. Each computer system may include any appropriate input devices (such as a keypad, touch screen, mouse, or other device that can accept information), output devices, mass storage media, or other suitable components for receiving, processing, storing, and communicating data. Both the input devices and output devices may include fixed or removable storage media such as a magnetic computer disk, CD-ROM, or other suitable media to both receive input from and provide output to a user. Each computer system may include a personal computer, workstation, network computer, kiosk, wireless data port, personal data assistant (PDA), one or more processors within these or other devices, or any other suitable processing device. In short, controller 114 may include any suitable combination of software, firmware, and hardware.

Controller 114 may additionally include one or more processing modules 148. The processing modules 148 may each include one or more microprocessors, controllers, or any other suitable computing devices or resources and may work, either alone or with other components of system 100, to provide a portion or all of the functionality of system 100 described herein. Controller 114 may additionally include (or be communicatively coupled to via wireless or wireline communication) one or more memory modules 150. The memory modules 150 may each include any memory or database module and may take the form of volatile or non-volatile memory, including, without limitation, magnetic media, optical media, random access memory (RAM), read-only memory (ROM), removable media, or any other suitable local or remote memory component.

In certain embodiments, it may be desirable for robot carriage 110 to translate along track 108 at a speed corresponding to a milking stall 104 of rotary milking platform 102 such that the robot arm 112 riding on robot carriage may perform one or more functions associated with the milking of a dairy cow 106 in the milking stall 104 while the rotary milking platform 102 is in motion. Accordingly, controller 114 may include position control logic 152, which may include any information, logic, and/or instructions stored and/or executed by controller 114 to control the movement of robot carriage 110 on track 108 relative to a stall 104 of rotary milking platform 102. For example, position control logic 152 may be operable to control the movement of robot carriage 110 on track 108 based on one or more rotary encoder signals 118 generated by rotary encoder 116.

In certain embodiments, position control logic 152 may determine a desired linear position for robot carriage 110 ($X_{desired}$) based on a comparison of (1) a first rotary encoder signal 118 corresponding to a rotational position of rotary milking platform 102 at which a particular stall 104 is adjacent to a starting linear position of robot carriage 110 on track 108 ($X_{start}$), and (2) a second rotary encoder signal 118 corresponding to a current position of the particular stall 104 (a position at which the particular stall 104 is adjacent to position located between the starting linear position of robot carriage 110 on track 108 ($X_{start}$), and an ending linear position of robot carriage 110 on track 108 ($X_{end}$)). For example, the first rotary encoder signal 118 may comprise a count of pulses generated by rotary encoder 116 at the time when the particular stall 104 triggers a proximity switch (or any other suitable sensor) indicating that the particular stall 104 has reached a position adjacent to a starting linear position of robot carriage 110 on track 108 ($X_{start}$), and the second rotary encoder signal 118 may comprise a current count of pulses generated by rotary encoder 116. As a result, the difference between the second rotary encoder signal 118 and the first rotary encoder signal 118 may correspond to a distance traveled by the particular stall 104 through the area adjacent to track 108.

Because the outside circumference of rotary milking platform 102 and the number of pulses generated by rotary encoder 116 per revolution of rotary milking platform 102 may each be known (e.g., 50 meters and 1000 pulses/revolution, respectively), the distance traveled by a milking stall 104 of rotary milking platform 102 per pulse of rotary encoder 116 may also be known (e.g., 50 meters/1000 pulses, or 0.05 meters per pulse). Therefore, the number of pulses generated by rotary encoder 116 between the first rotational position (i.e., the position at which the milking stall 104 is adjacent to $X_{start}$) and the second rotational position may correspond to the total distance traveled by the milking stall 104 after passing the position adjacent $X_{start}$. Because robot carriage 110 will need to move from $X_{start}$ the same distance to track the movement of the milking stall 104, the desired linear position for robot carriage 110 ($X_{desired}$) relative to the starting linear position of robot carriage 110 ($X_{start}$) may be determined as follows:

$$X_{desired} = \frac{EV_2 - EV_1}{A}$$

where:
$X_{desired}$=linear position of robot carriage 110 relative to $X_{start}$;
$EV_1$=rotary encoder value (# of pulses) of first rotary encoder signal;
$EV_2$=rotary encoder value (# of pulses) of second rotary encoder signal; and
A=distance traveled by a milking stall 104 per pulse of rotary encoder 116 ((# of pulses per revolution of rotary milking platform 102)/(outside circumference of rotary milking platform 102))

Having determined the desired linear position of robot carriage 110 on track 108, position control logic 152 may be further operable to generate a position signal 154 to be communicated to carriage actuator 132 (and/or actuator drive mechanism 134). The position signal 154 may cause extension/retraction of carriage actuator 132 such that robot carriage 108 is moved to the desired linear position ($X_{desired}$). By repeating the above-described calculation of the desired linear position of robot carriage 110 ($X_{desired}$) at regular intervals, position control logic 152 may cause robot carriage 108 to track the movement of the particular stall 104 of milking parlor 102 as the stall moves adjacent to track 108. Moreover, when a next stall 104 reaches a position adjacent to the starting linear position of robot carriage 110 on track 108 ($X_{start}$) (e.g., triggering the above-described proximity switch), position control logic 152 may cause robot carriage 108 to track the movement of the next stall 104. As a result, position control logic 152 may allow robot carriage 104 to track the movement of each stall 104 of rotary milking platform 104 as each stall moves through the area adjacent to track 108.

In certain embodiments, position control logic 152 may be further operable to determine an error between the calculated desired linear position for robot carriage 110 ($X_{desired}$) and an actual linear position of robot carriage 110 ($X_{actual}$). Position control logic 152 may determine the actual linear position of robot carriage 110 ($X_{actual}$) relative to the starting linear position of robot carriage 110 ($X_{start}$) based on the number of pulses of an absolute encoder signal 126 generated by absolute encoder 124 (as absolute encoder 124 may generate a known number of pulses per meter of linear movement of carriage 110). If the determined error exceeds a threshold value (e.g., 0.1 meters), position control logic 152 may cause the rotation of rotary milking platform 102 to stop (e.g., by communicating a stopping signal to a rotary drive motor of rotary milking platform 102).

With robot carriage translating laterally along track 108 at a speed corresponding to that of a milking stall 104 of rotary milking platform 102 (as described above), at least a portion of robot arm 112 may be extended between the legs of a dairy cow 106 in milking stall 104 in order to perform one or more operations associated with the milking of the dairy cow 106. In order to avoid contact between the robot arm 112 and the dairy cow 106, it may be desirable to ensure that the legs of the dairy cow 106, such as the hind legs, are spaced far enough apart to allow for the extension of at least a portion of robot arm 112 there between. Accordingly, controller 114 may additionally include vision control logic 156, which may include any information, logic, and/or instructions stored and/or executed by controller 114 to determine, based on image signal(s) 146 generated by vision system 142, whether the hind legs of a dairy cow 106 are spaced far enough apart to allow for a particular operation by robot arm 112. In a particular embodiment, vision control logic 156 may determine whether the hind legs of a dairy cow 106 are spaced far enough apart by analyzing image signal 146 to find particular edges of the rear of the dairy cow 106. The particular edges may be located by analyzing depth information of the visual data and to determine which portions represent the dairy cow 106 and which portions do not (as the transitions between those portions may represent the particular edges of the rear of the dairy cow 106).

For example, vision control logic 156 may process an image signal 146 to determine the depth of the pixels in the x-dimension (as reflected by the coordinate system illustrated in FIG. 3), which may represent a distance between camera 144 and a particular object (e.g., the dairy cow 106, a portion of the milking stall 104, etc.) presented in the image signal 146. An example method of determining the depth of pixels may be by measuring the time of flight of a light signal between camera 144 and a particular object captured in image signal 146 in the x-dimension. Vision control logic 156 may then compare the depth information of a cluster of pixels of image signal 146 to the depth information of another cluster of pixels within a portion of image signal 146. Because a cluster of pixels relatively close to camera 144 may signify the dairy cow 106 and a cluster of pixels relatively far away from camera 144 may signify an object other than the dairy cow 106 (e.g., a portion of the milking stall 104 housing the dairy cow 106), a portion of image signal 146 where pixels transition from relatively close to camera 144 to relatively far away from to camera 144 (or vice versa) may correspond to an edge location of the dairy cow 106.

Figure 4:
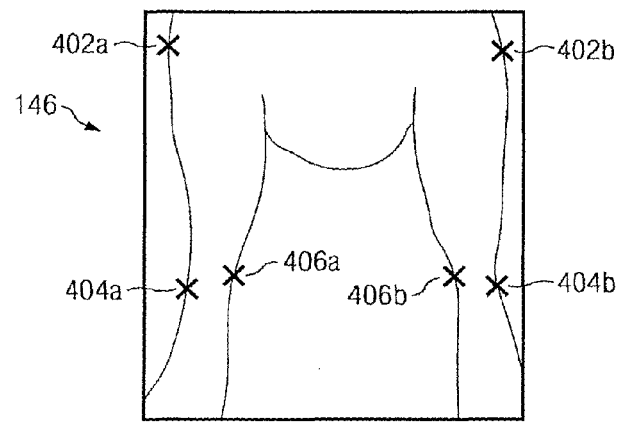
FIG. 4 illustrates an example image signal identifying located edges in depth corresponding to the edges of the hind legs of a dairy cow, according to certain embodiments of the present disclosure.

FIG. 4 illustrates an example image signal 146 that may be processed by vision control logic 156 in order to determine whether the hind legs of a dairy cow 106 are spaced far enough apart to allow for a particular operation by robot arm 112. Vision control logic 156, by comparing depth information of the visual data (as described above), may process the image signal 146 to determine hip locations 402, outer hind locations 404, and inner hind locations 406. In particular, vision control logic 156 may begin to determine whether the hind legs of the diary cow 106 are spaced far enough apart by locating hip location 402a. Vision control logic 156 may do this by comparing the depth locations of pixels of an upper outer area of image signal 146, or any other area of image signal 146 likely to include the hip of the dairy cow 106. Vision control logic 156 may determine that the cluster of pixels where depth location transitions from being relatively close to camera 144 to relatively far from camera 144 (or vice versa) represents a first edge corresponding to the hip of the dairy cow 106. In certain embodiments, this location may correspond with hip location 402a. Vision control logic 156 may then store the hip location 402a in memory 150 or in any other suitable component of controller 114.

After determining the hip location 402a of dairy cow 106, vision control logic 156 may attempt to locate the hind leg of the dairy cow 106. For example, vision control logic 156 may analyze a portion of the image signal 146 below the determined hip location 402a in the y-dimension (as reflected by the coordinate system illustrated in FIG. 3) as that location may be likely to include outer hind location 404a. By locating edges in pixel depth in that area of image signal 146 (in a substantially similar manner to that described above), vision control logic 156 may locate outer hind location 404a (which may be stored in memory 150 or in any other suitable component of controller 114). Having determined outer hind location 404a, vision control logic 156 may begin to analyze portions of the image signal 146 to the right of the determined hip location 402a in the z-dimension (as reflected by the coordinate system illustrated in FIG. 3) as the next encountered edge in depth in that direction may correspond to inner hind location 406a (which may be stored in memory 150 or in any other suitable component of controller 114).

In certain embodiments, vision control logic 156, having determined inner hind location 406a, may analyze portions of image signal 146 above and below (in the y-dimension, as reflected by the coordinate system illustrated in FIG. 3) the determined inner hind location 406a to locate subsequent edges in depth. These additional edges in depth may represent an outline of the inner edge of the hind leg of the dairy cow 106.

Having determined hip location 402a, outer hind location 404a, inner hind location 406a, and the inner edge of the hind leg of the dairy cow 106, vision control logic 156 may process the opposing side of image signal 146 to determine hip location 402b, outer hind location 404b, inner hind location 406b, and the inner edge of the other hind leg of the dairy cow 106 (in a substantially similar manner to that described above).

Once the inner edges of each hind leg of the dairy cow 106 have been located, vision control logic 156 may determine whether the hind legs of the dairy cow 106 are far apart enough to allow for the proper operation of at least a portion of robot arm 112 by calculating the distance between the hind legs. For example, vision control logic 156 may calculate the distance between inner hind locations 406a and 406b. As another example, vision control logic 156 may determine an inner-most point along the inner edge of each hind leg of the dairy cow 106 (e.g., the location along each determined inner edge closest to the center of the image signal 146) and calculate the distance between those two points. In certain embodiments, the inner-most point of each hind leg may be calculated within a working area. For example, the working area may be an area between the inner hind edges where robot arm 112 may operate. The measurements of the working area may be based at least in part upon the width and/or height of a portion of robot arm 112 likely to be operating between the hind legs of the dairy cow 106. In such an embodiment, vision control logic 156 may analyze visual data along the detected inner hind edge in a substantially vertical direction within the working area to determine the inner-most location. If the determined distance between the hind legs exceeds a distance threshold (e.g., a minimum distance allowing for the robot arm 112 to properly operate), vision control logic 156 may determine that the hind legs of the dairy cow 106 are spaced far enough apart to allow for the proper operation of at least a portion of robot arm 112.

If vision control logic 156 determines that the hind legs of the dairy cow 106 are spaced far enough apart, vision control logic 156 may facilitate the communication of signals to one or more of arm actuators 138, the communicated signals causing extension/retraction of arm actuators 138 such that at least a portion of robot arm 112 (e.g., tool attachment 140) extends toward the space between the hind legs of the dairy cow 106 (e.g., at a predetermined height relative to the milking stall in which the dairy cow 106 is located). Because image signal 146 may comprise a three-dimensional video image (as described above), the image signal 146 may change in real time as camera 144 moves toward the dairy cow 106. Accordingly, the present disclosure contemplates that vision control logic 156 may update, either continuously or at predetermined intervals, the determined leg positions as image signal 146 changes. Furthermore, vision control logic 156, or any other suitable component, may be operable to determine whether a portion of robot arm 112 is in contact with the dairy cow 106. In such an instance, vision control logic 156 may facilitate the communication of signals to one or more of arm actuators 138 to cause extension/retraction of arm actuators 138 such that at least a portion of robot arm 112 is no longer in contact with the dairy cow.

Although the above-described example embodiment relates to determining whether there is enough space between the hind legs of a dairy cow 106, the present disclosure contemplates that vision control logic 156 performance may determine, in a similar manner, whether there is enough space between a front leg and a hind leg of a dairy cow 106.

Prior to extending at least a portion of the robot arm 112 between the hind legs of the dairy cow 106 to perform certain functions associated with the milking of the dairy cow 106 (e.g., applying disinfectant to the teats to the dairy livestock 106), it may be desirable to ensure that a milking claw 107 is not attached to the teats of a diary cow 106. Accordingly, controller 114 may additionally include milking claw detection logic 158, which may include any information, logic, and/or instructions stored and/or executed by controller 114 to determine whether to extend robot arm 112 between the hind legs of a dairy cow 106 based on whether a milking claw 107 is attached to the teats of the dairy cow 106.

In certain embodiments, milking claw detection logic 158 may determine whether a milking claw 107 is attached to the teats of the dairy cow 106 when a milking stall 104 in which the dairy cow 106 is located enters an area adjacent to track 108 and robot arm 112. For example, milking claw detection logic 158 may receive a trigger (e.g. from a proximity switch or any other suitable sensor associated with the rotary milking platform 102) indicating that the milking stall 104 in which the dairy cow 106 is located has entered an area adjacent to track 108, and may determine whether a milking claw 107 is attached in response to that trigger. Moreover, milking claw detection logic 158 may determine whether a milking claw 107 is attached while rotary milking platform 102 is rotating and while the robot carriage 110 carrying robot arm 112 translates along track 108 at a speed corresponding to that of the stall 104 housing the dairy cow 106 (as described above) Alternatively, milking claw detection logic 158 may determine whether a milking claw 107 is attached while robot arm 112 remains stationary, and robot carriage 110 may begin to track the movement of the milking stall subsequent to a determination that the milking claw 107 is not attached.

Milking claw detection logic 158 may determine whether a milking claw 107 is attached using one of at least three different methods. As a first method, milking claw detection logic 158 may access a milking claw detachment signal 147, the milking claw detachment signal 147 indicating whether the milking claw 107 has detached from the teats of the dairy cow. Milking claw detachment signal 147 may be generated by a computer system associated with the rotary milking platform 102. Alternatively, rather than indicating whether the milking claw 107 has detached, milking claw detachment signal 147 may indicate whether the milking claw 107 is attached to the teats of the dairy cow 106. In other embodiments, milking claw detachment signal 147 may indicate other operational data associated with the rotary milking platform 102 from which milking claw detection logic 158 may determine whether milking claw 107 is attached. For example, milking claw detachment signal 147 may indicate whether vacuum pressure is being applied to the milking claw 107 as part of a milking operation, from which milking claw detection logic 158 may determine that milking claw 107 is attached to the teats of the dairy cow. Thus, milking claw detection logic 158 may determine whether the milking claw 107 is attached based on milking claw detachment signal 147.

Figure 5A:
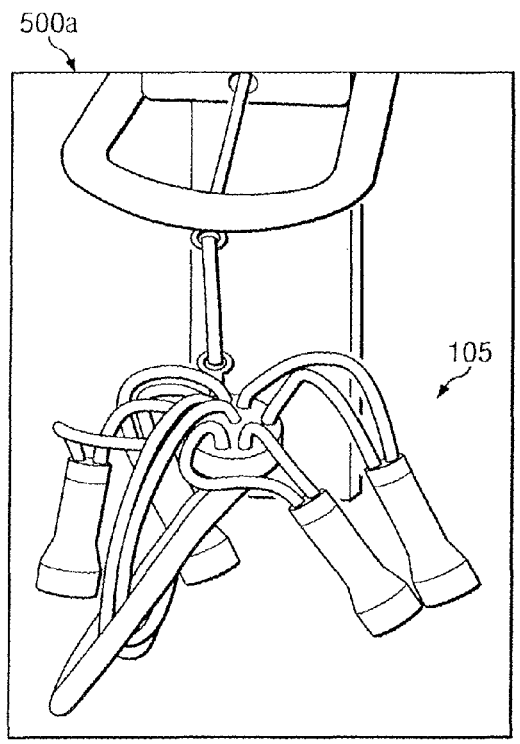
FIGS. 5A-5B illustrate example image signals corresponding to an example storage location of a milking claw in the system depicted in FIG. 1, according to certain embodiments of the present disclosure.
Figure 5B:
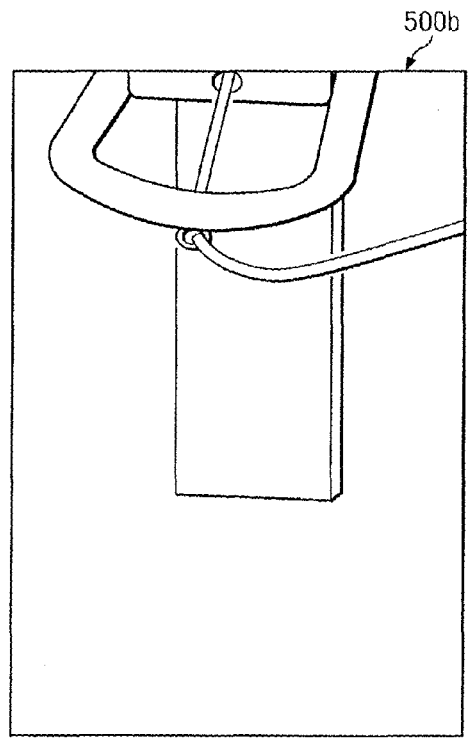

As a second method of determining whether milking claw 107 is attached, milking claw detection logic 158 may determine whether the milking claw 107 is present at a storage location 115 (i.e. no longer attached to the teats of the dairy cow) by processing an image signal 146 (e.g., a three-dimensional video image signal), as described above) representing the storage location 115 of a milking stall 104. FIGS. 5A-5B illustrate example snapshots 500a-b of an image signal 146 corresponding to an example storage location 115 of an example milking stall 104, according to certain embodiments of the present disclosure. In particular, FIG. 5A illustrates an example snapshot 500a of an image signal 146 corresponding to storage location 115 when milking claw 107 is present at storage location 115, and FIG. 5B illustrates an example snapshot 500b of an image signal 146 corresponding to storage location 115 when milking claw 107 is not present at storage location 115.

As one way of determining whether the milking claw 107 is present at the storage location 115 based on an accessed image signal 146, milking claw detection logic 158 may compare the accessed image signal 146 to a reference image signal 160. In certain embodiments, the reference image signal 160 may correspond to storage location 115 when the milking claw 107 is present at storage location 115 (e.g., snapshot 500a of FIG. 5A). The comparison may be performed by comparison of individual depth values of image signal 146 with individual depth values of the reference image signal 160, by correlation of image signal 146 with the reference image signal 160 using any suitable correlation detector, or by any other suitable method. If image signal 146 is sufficiently similar to the reference image signal 160, milking claw detection logic 158 may determine that milking claw 107 is present at storage location 115, and therefore that milking claw 107 is not attached to the teats of the dairy cow. In certain other embodiments, the reference image signal 160 may correspond to storage location 115 when the milking claw 107 is not present at storage location 115 (e.g., snapshot 500b of FIG. 5B). In that case, if image signal 146 is sufficiently similar to the reference image signal 160, milking claw detection logic 158 may determine that milking claw 107 is not present at storage location 115, and therefore that milking claw 107 is attached to the teats of the dairy cow.

Alternatively, milking claw detection logic 158 may compare an accessed image signal 146 to two reference image signals 160: a first reference image signal 160 that corresponds to storage location 115 when the milking claw 107 is present at storage location 115, and a second reference image signal 160 that corresponds to storage location 115 when the milking claw 107 is not present at storage location 115. Milking claw detection logic 158 may then determine whether image signal 146 is more similar to the first reference image signal 160, in which case milking claw detection logic 158 may determine that milking claw 107 is not attached to the teats of the dairy cow, or to the second reference image signal 146, in which case milking claw detection logic 158 may determine that milking claw 107 is attached to the teats of the dairy cow.

As another way of determining whether the milking claw 107 is present at the storage location 115 based on an accessed image signal 146, milking claw detection logic 158 may compare the plurality of depth values of image signal 146 to a threshold depth value. Because milking claw 107, when present at storage location 115, may be relatively close to camera 144 as compared to the space located around milking claw 107, and as compared to storage location 115 when milking claw 107 is not present, if many depth values in image signal 146 are smaller (i.e. closer to camera 144) than a threshold depth value, it may indicate that milking claw 107 is present at storage location 115. Conversely, if few depth values in image signal 146 are smaller than a threshold depth value, it may indicate that milking claw 107 is not present at storage location 115. In certain embodiments, milking claw detection logic 158 may count the number of depth values in image signal 146 that are smaller than the threshold depth value. If the counted number is greater than a determined triggering count, milking claw detection logic 158 may determine that milking claw 107 is present at storage location 115, and therefore that milking claw 107 is not attached to the teats of the dairy cow. Otherwise, milking claw detection logic 158 may determine that milking claw 107 is not present at storage location 115, and therefore that milking claw 107 is attached to the teats of the dairy cow. The determined triggering count may be set to one, an arbitrary number, a number based on the resolution of camera 144, a number determined by analyzing one or more reference image signals 160, or any other suitable number.

In alternative embodiments, milking claw detection logic 158 may count the number of depth values in image signal 146 that exceed the threshold depth value. If the counted number is greater than a determined triggering count, milking claw detection logic 158 may determine that milking claw 107 is not present at storage location 115, and therefore that milking claw 107 is attached to the teats of the dairy cow. Otherwise, milking claw detection logic 158 may determine that milking claw 107 is present at storage location 115, and therefore that milking claw 107 is not attached to the teats of the dairy cow.

In some embodiments, the threshold depth value may be selected based on the distance between camera 144 and storage location 115. In other embodiments, the threshold depth value may be selected based on a reference image signal 160. For example, using a reference image signal 160 corresponding to storage location 115 when the milking claw 107 is not present at storage location 115, as illustrated in FIG. 5B, the threshold value could be set such that all or substantially all of the depth values in the reference image signal 160 would be greater than the threshold value.

As a third method of determining whether milking claw 107 is attached, milking claw detection logic 158 may process an image signal 146 (e.g., a three-dimensional video image signal) representing the rear of the dairy cow 106 in order to determine whether the milking claw 107 is attached to the teats of the dairy cow 106. For example, milking claw detection logic 158 may determine whether milking claw 107 is attached by processing the image signal 146 of the rear of the dairy cow 106 using either of the techniques described above—comparing image signal 146 to a reference image signal 160, or comparing the plurality of depth values in image signal 146 to a threshold depth value—or any other suitable technique. In this case, reference image signal 160 may correspond to the rear of the dairy cow when milking claw 107 is attached (i.e. present in the image). Similarity of image signal 146 to reference image signal 160 may then indicate that milking claw 107 is attached. Conversely, reference image signal 160 may correspond to the rear of the dairy cow when milking claw 107 is not attached, in which case similarity to image signal 146 may indicate that milking claw 107 is not attached. Likewise, the threshold depth value may be set based on one or more reference image signals 160 or based on a distance between camera 144 and the expected location of milking claw 107 when attached (e.g. the teats of the cow).

Figure 6A:
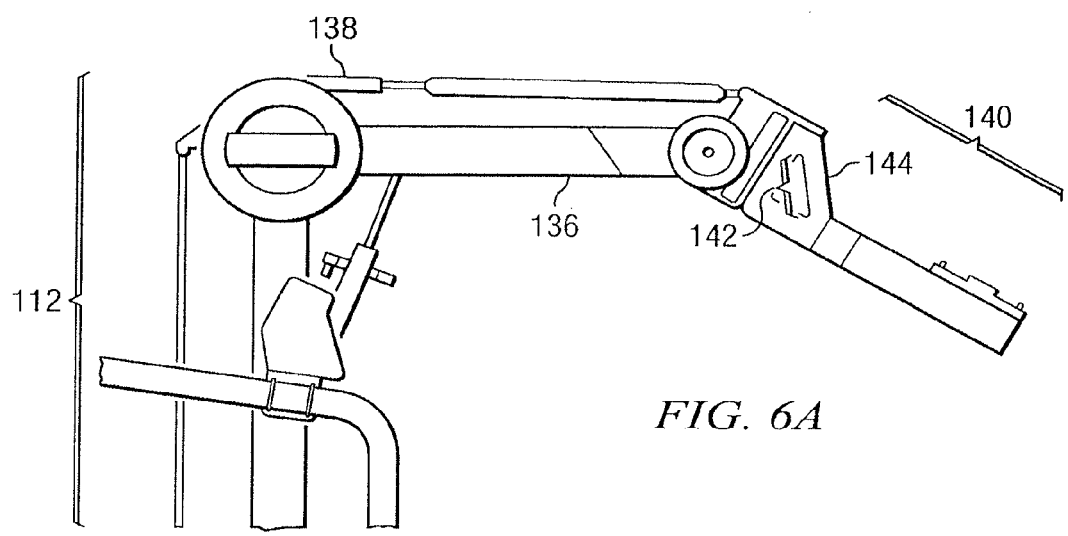
FIGS. 6A-6B illustrate example positions of a robot arm for the generation of an image signal, according to certain embodiments of the present disclosure.
Figure 6B:
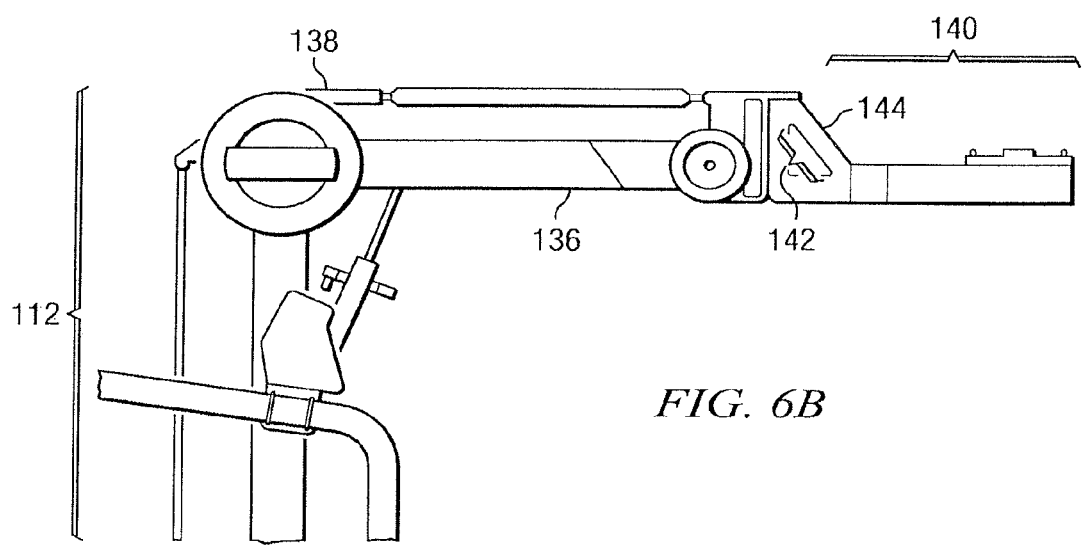

Because camera 144 of vision system 142 may not generate both of the above-described image signals 146 (i.e., the image signal 146 including storage location 115 and the image signal 146 including the rear of the dairy cow 106) with robot arm 112 in the same position (as both locations may not be in the field of view of camera 144), all or a portion of robot arm 112 may be able to articulate between the different imaging positions. For example, as illustrated in FIGS. 6A-6B, robot arm 112 may be operable to pivot between an imaging position (e.g., a position where an image signal 146 representing storage location 115 may be generated, as illustrated in FIG. 6A) and an operating position (e.g., a position where an image signal 146 representing the rear of the dairy cow 106 may be generated, as illustrated in FIG. 6A). This illustrated articulation of robot arm 112 be accomplished, for example, by rotation of tool attachment 140 about the point of attachment to arm member 136 (e.g. by extension/retraction of arm actuator 138). In certain embodiments (e.g., embodiments in which the attachment of a milking claw is determined by processing an image signal 146 representing the storage location 115, as described above), milking claw detection logic 158 may control the robot arm 112 to pivot to the imaging position (e.g. by communicating a signal to arm actuator 138 to extend or retract) before accessing the image signal 146 upon which the determination is made. Subsequently, after determining that a milking claw 107 is attached, controller 114 may control the robot arm 112 to pivot to the operating position (e.g. by communicating a signal to arm actuator 138 to extend or retract) before accessing the image signal 146 to determine the position of the cow's legs (e.g. using vision control logic 156).

If, based on one or more of the above-described method, milking claw detection logic 158 determines that a milking claw 107 is not attached, controller 114 may initiate performing further desired operations (e.g. the disinfectant application process) by extending robot arm 112 between the hind legs of dairy cow 106 (e.g. using vision control logic 156). Otherwise, no further action may be performed until a next milking stall 104 enters the area adjacent to track 108 and robot arm 112.

Particular embodiments of system 100 may provide one or more technical advantages. For example, certain embodiments of system 100 may allow robot carriage 110 to accurately track the movement of a stall 104 of the adjacent rotary milking platform 102. Because the robot carriage 110 may carry a robot arm 112 configured to perform one or more functions associated with the milking of a dairy cow 106 located in the stall 104 of the rotary milking platform 102 (e.g., a robotic arm for applying disinfectant to the teats of the dairy livestock and/or attaching a milking claw to the teats of the dairy livestock), certain embodiments of system 100 may facilitate a reduction in the need for human labor to perform certain functions associated with milking dairy cows 106 using rotary milking platform 102. As a result, certain embodiments of system 100 may reduce the cost associated with certain dairy milking operations. In addition, the automation facilitated by certain embodiments of system 100 may increase the throughput of rotary milking platform 102, thereby increasing the overall milk production of rotary milking platform 102.

As another example, using vision system 142 may improve the visibility of the dairy cow 106 and may facilitate milking-related operations from a position to the rear of the dairy cow 106. Approaching from the rear of the dairy cow makes it less likely that the cow will be distracted by the milking equipment. Furthermore, approaching from the rear of the dairy cow makes it less likely that the dairy livestock will kick the milking equipment, vision system 142, or any other component of the system of the present disclosure. Additionally, use of vision system 142 may allow for the safe operation of robot arm 112 without disturbing the dairy cow during any portion of the milking operation. For example, vision system 142 may facilitate the detection of a properly spaced working area between the hind legs of the dairy cow, allowing robot arm 112 to extend between the dairy cow's hind legs without coming into contact with the dairy cow. Moreover, by preventing the robot arm 112 from extending between the legs of a dairy cow 106 while a milking claw is attached to the teats of the cow, certain embodiments of system 100 may prevent injury to the cow and/or damage to the robot arm 112 or other components of system 100.

Figure 7:
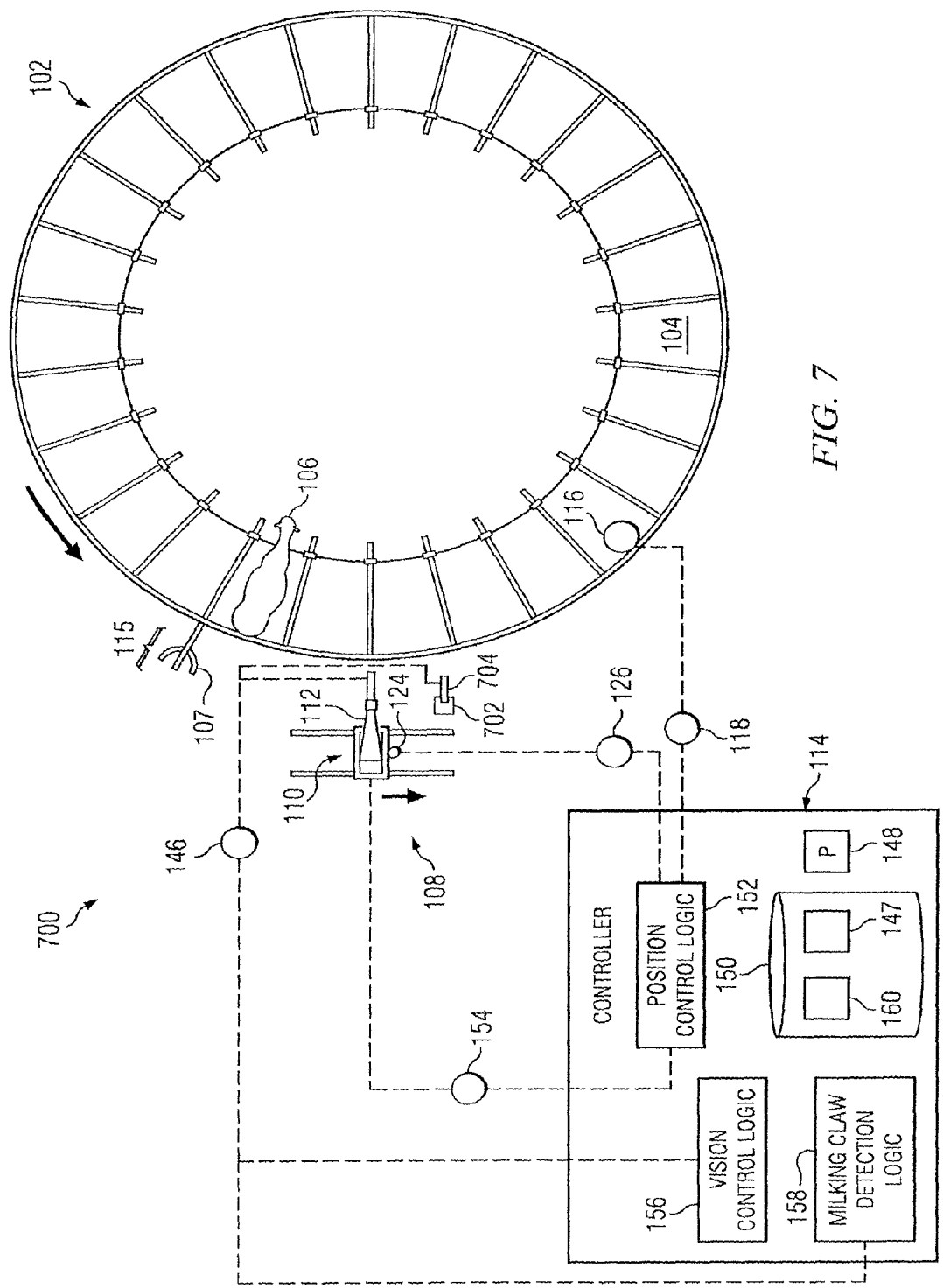
FIG. 7 illustrates an alternative example rotary milking system, according to certain embodiments of the present disclosure.

Although a particular implementation of system 100 is illustrated and primarily described, the present disclosure contemplates any suitable implementation of system 100, according to particular needs. For example, although certain of the above-described functions are described as being performed by position control logic 152, vision control logic 156, or milking claw detection logic 158, the present disclosure contemplates the described functionality as being performed by any suitable logic or combination of logic, according to particular needs. Additionally, although the vision system 142 housing camera 144 is depicted and described above as being positioned on tool attachment 140, the present disclosure contemplates vision system 142 being located separate from tool attachment 140, as depicted in the alternative example rotary milking system 700 depicted in FIG. 7. In the depicted alternative system 700 embodiments, a standalone vision system 702 housing a camera 704 may be positioned on the ground near robot arm 112. Use of standalone vision system 702 may be advantageous when a storage location 115 of a milking stall 104 would be below the line of sight of a camera mounted on robot arm 112.

Figure 8:
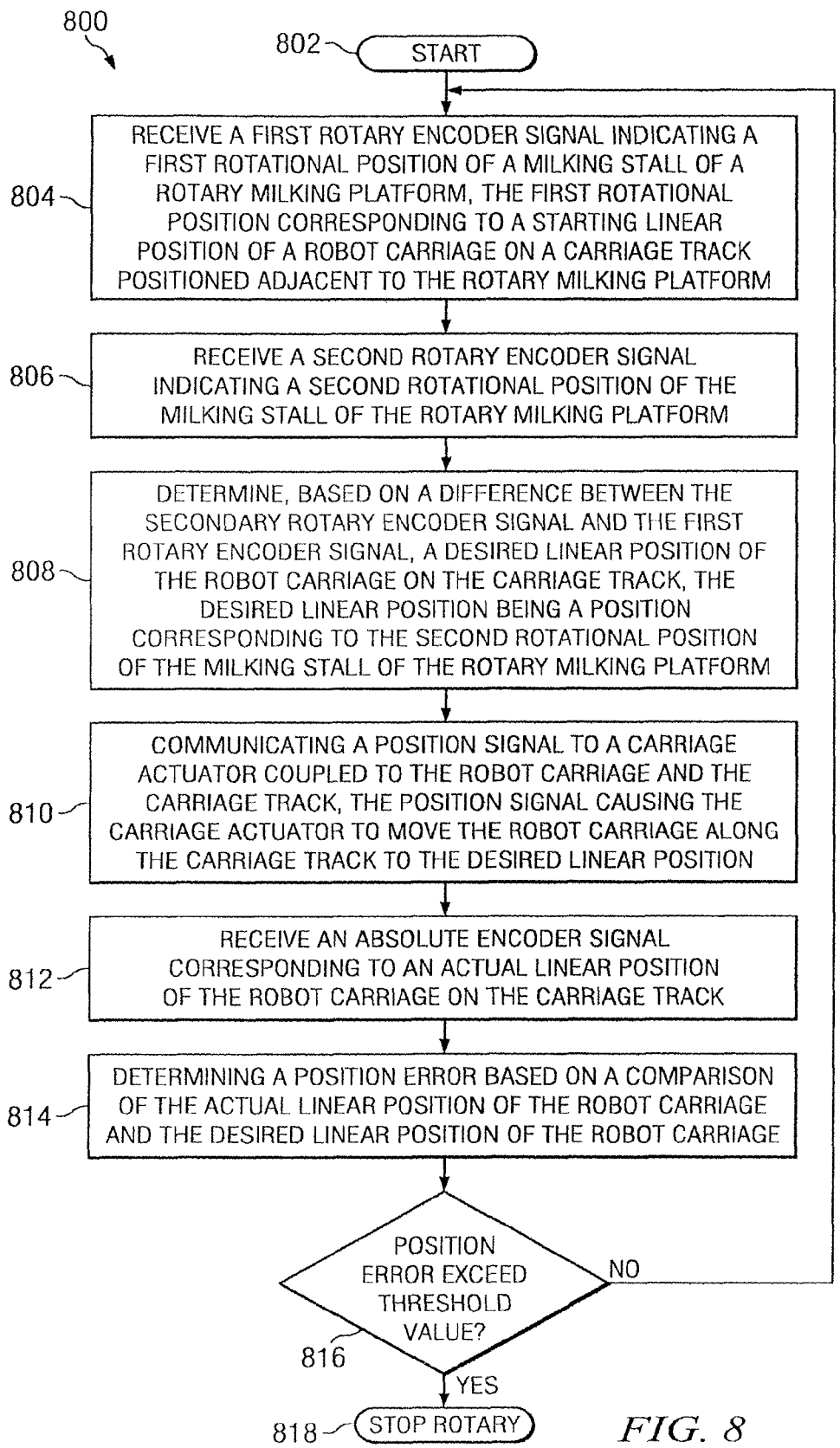
FIG. 8 illustrates an example method for controlling the position of a robot carriage based on the position of a milking stall of an adjacent rotary milking platform, according to certain embodiments of the present disclosure.

FIG. 8 illustrates an example method 800 for controlling the position of robot carriage 110 based on the position of a stall 104 of an adjacent rotary milking platform 102, according to certain embodiments of the present disclosure. Although method 800 is described with regard to tracking the movement of a single stall 104, the present disclosure contemplates that method 800 could be performed for each stall 104 of a rotary milking platform 102.

The method begins at step 802. At step 804, controller 114 receives a first rotary encoder signal 118 generated by rotary encoder 116. The first rotary encoder signal 118 may comprise a number of pulses generated by rotary encoder 116 when a particular milking stall 104 of rotary milking platform 102 is located adjacent to the starting linear position of robot carriage 110 on the track 108 positioned adjacent to rotary milking platform 102. At step 806, controller 114 receives a second rotary encoder signal 118 indicating a second rotational position of the particular stall 104 of rotary milking platform 102.

At step 808, controller 114 determines a desired linear position of robot carriage 110 on track 108 based on the difference between the second rotary encoder signal 118 and the first rotary encoder signal 118 (as described above with regard to FIG. 1). The determined desired linear position of robot carriage 110 is a position corresponding to the second rotational position of the particular stall 104 (i.e., the current position of the particular stall 104).

At step 810, controller 114 communicates a position signal 154 to a carriage actuator 132 coupled to robot carriage 110 and track 108. The position signal 154 may cause extension/retraction of carriage actuator 132 such that robot carriage 110 is moved along track 108 to the desired linear position.

At step 812, controller 114 receives an absolute encoder signal 126 generated by absolute encoder 124. The absolute encoder signal 126 corresponds to the actual linear position of robot carriage 110 on track 108 (as absolute encoder 124 may generate a known number of pulses per meter traveled by robot carriage 110). At step 814, controller 114 determines a position error based on a comparison of the actual linear position of the robot carriage 110 and the previously-calculated desired linear position of robot carriage 110. At step 816, controller 114 determines if the position error exceeds a threshold value. If the position error does exceed the threshold value, controller 114 causes the rotation of rotary milking platform 102 to stop (e.g., by communicating a stopping signal to a rotary drive motor of rotary milking platform 102) and the method ends at step 818. Otherwise, the method returns to step 804.

Although the steps of method 800 have been described as being performed in a particular order, the present disclosure contemplates that the steps of method 800 may be performed in any suitable order, according to particular needs.

Although the present disclosure has been described with several embodiments, diverse changes, substitutions, variations, alterations, and modifications may be suggested to one skilled in the art, and it is intended that the disclosure encompass all such changes, substitutions, variations, alterations, and modifications as fall within the spirit and scope of the appended claims.

Figure 9:
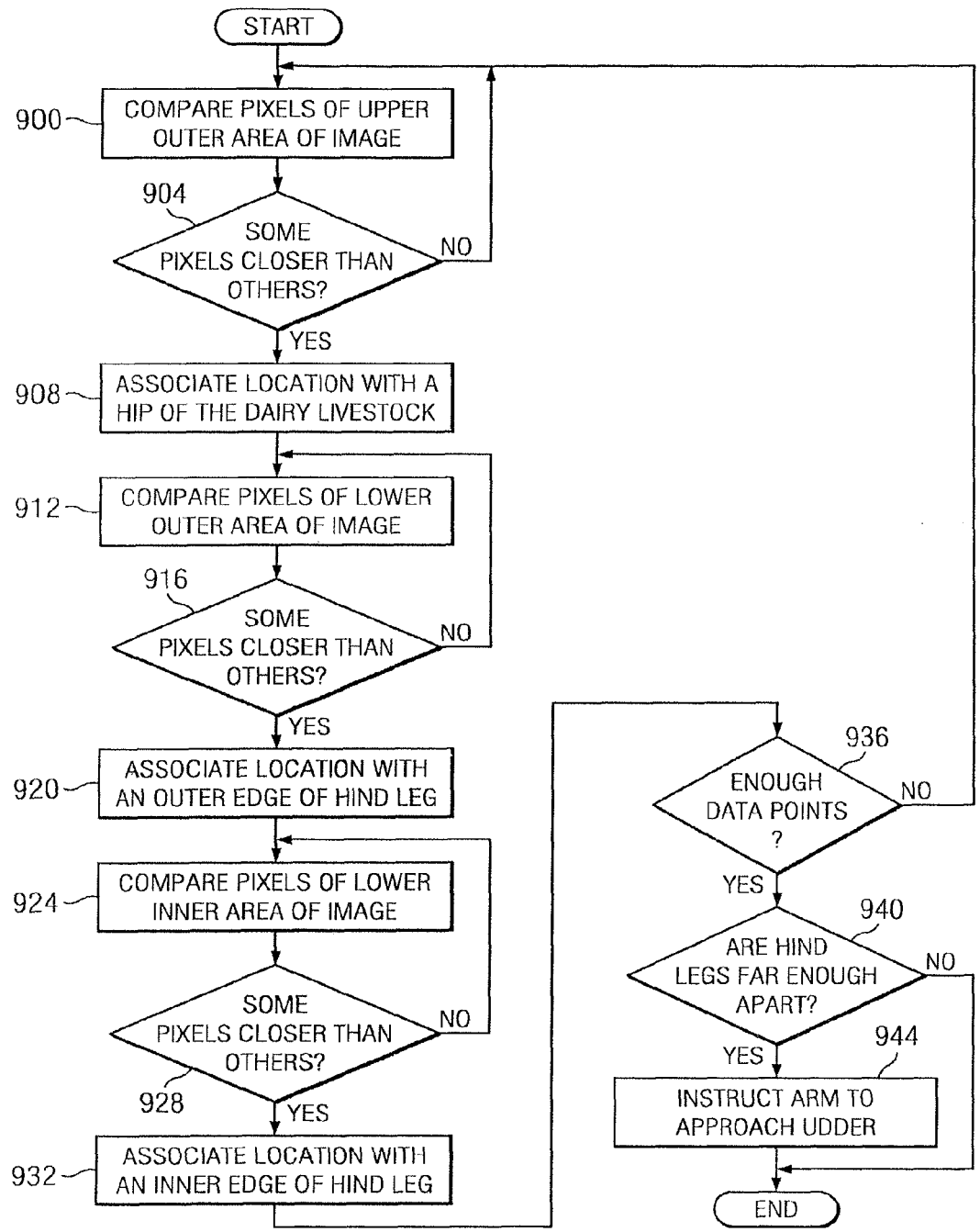
FIG. 9 illustrates an example method for analyzing an image signal to determine if the hind legs of a dairy cow are spaced far enough apart to allow for extension of a robotic arm, according to certain embodiments of the present disclosure.

FIG. 9 illustrates an example method for analyzing an image signal 146 to determine if the hind legs of a dairy cow 106 are spaced far enough apart to allow for extension of robot arm 112, according to certain embodiments of the present disclosure. The example method may begin at step 900. At step 900, vision control logic 156 may begin to compare pixels of an upper outer area of an image. For example, vision control logic 156 may access image signal 146 generated by camera 144. Vision control logic 156 may compare the pixels of image signal 146 by determining the depth of the pixels. In certain embodiments, the depth may be determined by measuring the time of flight of a light signal between camera 144 and a particular object captured in image signal 146. After collecting the depth information of a particular portion of pixels, the method may proceed to step 904. At step 904, vision control logic 156 may determine whether some pixels are closer than other pixels within a portion of image signal 146. For example, vision control logic 156 may compare the depth information of a group of pixels to determine if some pixels are closer than other pixels. A portion of image signal 146 which transitions from a cluster of pixels further from camera 144 to a cluster of pixels closer to camera 144 (or vice versa) may signify that an edge of the dairy cow 106 has been found. The cluster of pixels with depth information further away from camera 144 may signify that the image data is of an object other than an edge of the dairy cow 106. If vision control logic 156 has determined that some pixels are not closer than other pixels, then the example method may return to step 900 and continue analyzing information captured by camera 144. Otherwise, the example method may proceed to step 908.

At step 908, vision control logic 156 may associate the location of the cluster of pixels that are closer to camera 144 with an edge of the dairy cow 106. For example, vision control logic 156 may have determined that the cluster of pixels represents a first edge corresponding to the hip of the dairy cow 106. In certain embodiments, this location may correspond with hip location 402a of FIG. 4. Visual control logic 156 may store this association in memory 150 or in any other suitable component of controller 114.

After finding the hip of the dairy cow 106, vision control logic 156 may attempt to locate the hind leg of the dairy cow 106. To do this, at step 912, vision control logic 156 may compare the depth information of pixels in a lower outer area of image signal 146 or any other portion of image signal 146 that may include the hind legs of the dairy cow 106. For example, vision control logic 156 may traverse pixels of image signal 146 in a downward direction trying to locate the outer edge of a hind leg of a dairy cow 106.

Vision control logic 156 may then determine the location of an outer edge of a hind leg at step 916. Vision control logic 156 may do this by determining whether some pixels are closer than other pixels. A portion of image signal 146 which transitions from a cluster of pixels further from camera 144 to a cluster of pixels closer to camera 144 (or vice versa) may signify that an edge of the dairy cow 106 has been found. If vision control logic 156 has determined that some pixels are not closer than other pixels, then the example method may return to step 912 and continue analyzing information captured by camera 144. Otherwise, the example method may proceed to step 920.

At step 920, vision control logic 156 may associate the location of the cluster of pixels that are closer to camera 144 than another cluster of pixels within a portion of visual signal 146 with an edge of the dairy cow 106. For example, vision control logic 156 may have determined that the cluster of pixels represents an edge corresponding to an outer edge of a hind leg of the dairy cow 106. In certain embodiments, this location may correspond with outer edge location 404a of FIG. 4. Vision control logic 156 may store this association in memory 150 or in any other suitable component of controller 114.

Vision control logic 156 may then attempt to determine an inner edge location of a hind leg. At step 924, vision control logic 156 may begin to scan the depth information of pixels along a lower inner area of image signal 146. For example, vision control logic 156 may traverse pixels along the z-dimension (as illustrated in FIG. 3) from outer edge location 404a to the center of image signal 146 trying to locate an inner edge of the hind leg of the dairy cow 106. At step, 928, vision control logic 156 may determine whether some pixels are closer than other pixels. For example, vision control logic 156 may compare the depth information of a group of pixels to determine if a cluster of the pixels are closer than another cluster of pixels. If vision control logic 156 has determined that some pixels are not closer than other pixels, then the example method may return to step 924 and continue analyzing information captured by camera 144. Otherwise, the example method may proceed to step 932.

At step 932, vision control logic 156 may associate the location of the cluster of pixels that are closer to camera 144 with an edge of the dairy cow 106. For example, vision control logic 156 may have determined that the cluster of pixels represents an edge corresponding to an inner edge of a hind leg of the dairy cow 106. In certain embodiments, this location may correspond with inner edge location 406a of FIG. 4. In certain embodiments, vision control logic 156 may determine edge location 406a is the inner-most location of the hind legs of the dairy cow. For example, vision control logic 156 may analyze visual data along the detected inner edge in a substantially vertical direction to determine the inner-most location of the hind leg. The portion of the hind leg closest to the center of the dairy cow in the z-dimension may be considered the inner-most portion. In other embodiments, vision control logic 156 may determine edge location 406a is the inner-most location of the hind legs within the working area of dairy cow 106. For example, the working area may be an area between the inner hind edges where robot arm 112 may operate. The measurements of the working area may be based at least in part upon the width and/or height of a portion of robot arm 112 likely to be operating between the hind legs of the dairy cow 106. In such an embodiment, vision control logic 156 may analyze visual data along the detected inner hind edge in a substantially vertical direction within the working area to determine the inner-most location. Vision control logic 156 may store the association between the determined location and inner edge location 406a in memory 150 or in any other suitable component of controller 114.

After finding the edges corresponding to a side of the dairy cow 106, vision control logic 156 may determine if data points from both sides of the dairy cow 106 have been collected at step 936. If vision control logic 156 determines that data points from only a single side of the dairy cow 106 has been found, vision control logic 156 may proceed to determine the locations of the other hind leg of the dairy cow 106 at step 900. Otherwise, the example method may proceed to step 940.

Once edges of the dairy cow 106 are located, at step 940, vision control logic 156 may determine whether the hind legs of the dairy cow 106 are far apart enough to allow for the proper operation of at least a portion of robot arm 112. For example, after detecting the hind legs of the dairy cow, vision control logic 156 may calculate the distance between the hind legs. Vision control logic 156 may use any portion of image signal 146 to calculate the distance between the hind legs. In certain embodiments, vision control logic 156 may calculate the distance between the two inner hind edges of the dairy cow 106. As an example, vision control logic 156 may calculate the distance between inner edge locations 406a and 406b of FIG. 4. Vision control logic 156 may then determine whether the hind legs are far enough apart to properly operate at least a portion of robot arm 112. In certain embodiments, there may be a distance threshold associated with robot arm 112, wherein the distance threshold specifies a minimum distance between a diary cow's hind legs which allows for the robot arm 112 to properly operate. For example, there may be a distance threshold based at least in part on the width of robot arm 112 and/or any other equipment robot arm 112 may utilize to perform a particular function. If vision control logic 156 determines that the hind legs of the dairy cow 106 are far enough apart, vision control logic 156 may proceed with allowing robot arm 112 to operate between the hind legs of the dairy cow 106 at step 944. Otherwise, vision control logic 156 may not facilitate the instruction of robot arm 112 to proceed with a particular operation between the hind legs of the dairy cow and the example method may end.

At step 944, vision control logic 156, having determined the positions of each of the hind legs of the dairy cow, may facilitate the communication of signals to one or more of arm actuators 138, the communicated signals causing extension/retraction of arm actuators 138 such that at least a portion of robot arm 112 (e.g., tool attachment 140) extends toward the space between the hind legs of the dairy cow (e.g., at a predetermined height relative to the milking stall in which the dairy cow is located).

Although the steps of method 900 have been described as being performed in a particular order, the present disclosure contemplates that the steps of method 1000 may be performed in any suitable order, according to particular needs.

Figure 10:
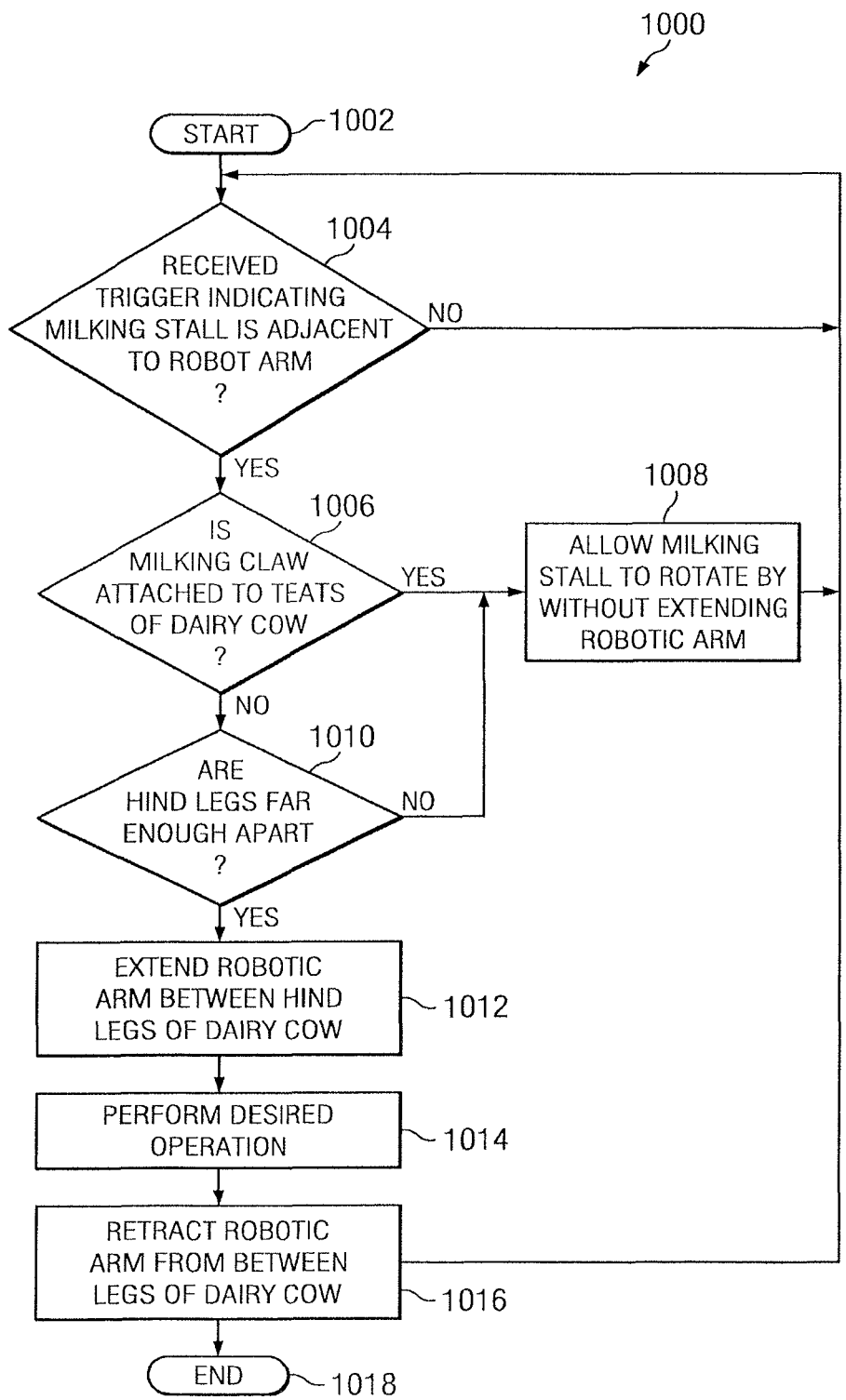
FIG. 10 illustrates an example method for determining whether to operate a robot in conjunction with a rotary milking platform based on detection of a milking claw, according to certain embodiments of the present disclosure.

FIG. 10 illustrates an example method 1000 for determining whether to operate a robot in conjunction with a rotary milking platform based on detection of a milking claw 107, according to certain embodiments of the present disclosure. The method begins at step 1002. At step 1004, controller 114 waits for a trigger indicating that a stall in which a dairy cow is located (e.g., a stall 104 of a rotary milking platform 102 positioned adjacent to track 108 and robot arm 112, as illustrated in FIG. 1) has entered an area adjacent to robot arm 112. For example, the trigger may be received from a proximity switch or any other suitable sensor associated with the rotary milking platform. If controller 114 receives the trigger, the method proceeds to step 1006. If not, controller 114 returns to step 1004 and continues to wait for the trigger.

At step 1006, controller 114 determines whether a milking claw is attached (e.g. milking claw 107, as described in connection with FIG. 1). This determination may be made using any of the three methods described above (e.g. using milking claw detection logic 158, as described in connection with FIG. 1), or in any other suitable way. In some embodiments, robot arm 112 may translate laterally to keep pace with the rotation of rotary milking platform 102 while making this determination (e.g. using position control logic 152, as described in connection with FIG. 1). If controller 114 determines that a milking claw is attached, the method proceeds to step 1008, where the controller 114 allows the milking stall to rotate by without extending the robotic arm between the legs of the dairy cow. If controller 114 determines that a milking claw is not attached, the method proceeds to step 1010.

At step 1010, controller 114 determines whether the hind legs of the dairy cow are far apart enough to allow for the proper operation of at least a portion of the robot arm. If it is not already doing so, the robot arm begins to track the rotational movement of the milking stall by moving laterally along a track (e.g. using position control logic 152). As a result, the robot arm may keep pace with a dairy cow located in a milking stall of the rotary milking platform. The positions of the hind legs of the dairy cow and the distance between them may be determined by processing an image signal from a camera (e.g. image signal 146 generated by vision system 142 housing camera 144, as described in connection with FIG. 2) in the manner described above (e.g. using vision control logic 156). If the hind legs are far enough apart (e.g. as determined by vision control logic 156), the method proceeds to step 1012. If not, the method proceeds to step 1008, where the controller 114 allows the milking stall to rotate by without extending the robotic arm between the legs of the dairy cow. In some embodiments, the robot arm may then stop tracking the movement of the stall in order to allow the stall to rotate by.

At step 1012, controller 114, having determined the positions of each of the hind legs of the dairy cow, may communicate signals to one or more of arm actuators 138, the communicated signals causing extension/retraction of arm actuators 138 such that at least a portion of robot arm 112 (e.g., tool attachment 140) extends toward the space between the hind legs of the dairy cow (e.g., at a predetermined height relative to the milking stall in which the dairy cow is located).

At step 1014, controller 114 may control the robot arm to perform the desired operation using the tool attachment. For example, a spray tool attachment may initiate the discharge of a disinfectant to the teats of the dairy cow. Once the function has been performed, controller 114 may, at step 1016, communicate signals to one or more of arm actuators 138, such that the robot arm retracts from between the legs of the dairy cow. In some embodiments, the robot arm may then stop tracking the movement of the stall in order to allow the stall to rotate by. The method then either returns to step 1004 (if there are additional dairy cows on which milking operations are to be performed) or ends at step 1018 (if there are no additional dairy cows on which milking operations are to be performed).

Although the steps of method 1000 have been described as being performed in a particular order, the present disclosure contemplates that the steps of method 1000 may be performed in any suitable order, according to particular needs.

Although the present disclosure has been described with several embodiments, diverse changes, substitutions, variations, alterations, and modifications may be suggested to one skilled in the art, and it is intended that the disclosure encompass all such changes, substitutions, variations, alterations, and modifications as fall within the spirit and scope of the appended claims.

What is claimed is:

1. A system for controlling the position of a robot carriage, comprising:
   a linear carriage track positioned adjacent to a rotary milking platform;
   a robot carriage positioned on the carriage track such that the robot carriage may move along the carriage track; and
   a controller that:
      determines a movement of a milking stall of the rotary milking platform from a first rotational position to a second rotational position;
      determines a position of the robot carriage on the carriage track corresponding to the movement of the milking stall of the rotary milking platform; and
      communicates a position signal to a carriage actuator coupled to the robot carriage and the carriage track, the position signal causing the carriage actuator to move the robot carriage along the carriage track to the determined position in conjunction with the movement of the rotary milking platform.

2. The system of claim 1, wherein the robot carriage comprises a robot arm having a spray tool operable to discharge an amount of disinfectant to the teats of a dairy livestock located in the milking stall of the milking platform as the rotary milking platform rotates.

3. The system of claim 1, wherein the robot carriage comprises a robot arm having a preparation tool operable to prepare the teats of a dairy livestock located in the milking stall of the milking platform for the attachment of one or more teat cups of a milking claw as the rotary milking platform rotates.

4. The system of claim 1, wherein the robot carriage comprises a robot arm having a teat cup attachment tool that attaches one or more teat cups of a milking claw to the teats of a dairy livestock located in the milking stall of the milking platform as the rotary milking platform rotates.

5. The system of claim 1, wherein the robot carriage comprises a robot arm operable to extend between the legs of a dairy livestock located in the milking stall as the rotary milking platform rotates.

6. The system of claim 1, wherein:
   the robot carriage moves from a first position to a second position;
   the first position of the robot carriage is a first linear position on the carriage track; and
   the second position of the robot carriage is a second linear position on the carriage track.

7. The system of claim 1, wherein the controller uses a plurality of rotary encoder signals to determine the first and second rotational positions of the milking stall.

8. A method for controlling the position of a robot carriage, comprising:
   determining by a controller a movement of a milking stall of a rotary milking platform from a first rotational position to a second rotational position;
   determining by the controller a position of the robot carriage on a linear carriage track corresponding to the movement of the milking stall of the rotary milking platform; and
   moving the robot carriage along the carriage track to the determined position in conjunction with the movement of the rotary milking platform.

9. The method of claim 8, wherein the robot carriage comprises a robot arm having a spray tool operable to discharge an amount of disinfectant to the teats of a dairy livestock located in the milking stall of the milking platform as the rotary milking platform rotates.

10. The method of claim 8, wherein the robot carriage comprises a robot arm having a preparation tool operable to prepare the teats of a dairy livestock located in the milking stall of the milking platform for the attachment of one or more teat cups of a milking claw as the rotary milking platform rotates.

11. The method of claim 8, wherein the robot carriage comprises a robot arm having a teat cup attachment tool operable to attach one or more teat cups of a milking claw to the teats of a dairy livestock located in the milking stall of the milking platform as the rotary milking platform rotates.

12. The method of claim 8, wherein the robot carriage comprises a robot arm operable to extend between the legs of a dairy livestock located in the milking stall as the rotary milking platform rotates.

13. The method of claim 8, wherein:
   the robot carriage moves from a first position to a second position;
   the first position of the robot carriage is a first linear position on the carriage track; and
   the second position of the robot carriage is a second linear position on the carriage track.

14. The method of claim 8, further comprising using a plurality of rotary encoder signals to determine the first and second rotational positions of the milking stall.

15. A system for controlling the position of a robot carriage, comprising:
   a carriage track positioned adjacent to a rotary milking platform;
   a robot carriage positioned on the carriage track; and
   a controller that causes the robot carriage to move linearly along the carriage track in conjunction with a rotational movement of the rotary milking platform;
   wherein the controller uses a plurality of rotary encoder signals to determine the rotational movement of the milking stall.

16. The system of claim 15, wherein the robot carriage comprises a robot arm having a spray tool operable to discharge an amount of disinfectant to the teats of a dairy livestock located in the milking stall of the milking platform as the rotary milking platform rotates.

17. The system of claim 15, wherein the robot carriage comprises a robot arm having a preparation tool operable to prepare the teats of a dairy livestock located in the milking stall of the milking platform for the attachment of one or more teat cups of a milking claw as the rotary milking platform rotates.

18. The system of claim 15, wherein the robot carriage comprises a robot arm having a teat cup attachment tool that attaches one or more teat cups of a milking claw to the teats of a dairy livestock located in the milking stall of the milking platform as the rotary milking platform rotates.

19. The system of claim 15, wherein the robot carriage comprises a robot arm operable to extend between the legs of a dairy livestock located in the milking stall as the rotary milking platform rotates.

20. The system of claim 15, wherein the rotational movement of the rotary milking platform is between a first rotational position and a second rotational position.

* * * * *